(12) United States Patent
Wakasa et al.

(10) Patent No.: US 8,805,280 B2
(45) Date of Patent: *Aug. 12, 2014

(54) INFORMATION PROCESSING APPARATUS, AND METHOD AND INFORMATION PROCESSING SYSTEM

(71) Applicant: Sony Corporation, Tokyo (JP)

(72) Inventors: Shigeki Wakasa, Kanagawa (JP); Yasuharu Ishikawa, Kanagawa (JP); Isao Soma, Saitama (JP); Hiroshi Nakayama, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,714

(22) Filed: Sep. 10, 2013

(65) Prior Publication Data

US 2014/0011454 A1 Jan. 9, 2014

Related U.S. Application Data

(63) Continuation of application No. 13/444,530, filed on Apr. 11, 2012, now Pat. No. 8,588,691, which is a continuation of application No. 12/182,418, filed on Jul. 30, 2008, now Pat. No. 8,175,529.

(30) Foreign Application Priority Data

Aug. 8, 2007 (JP) ................................. 2007-206709

(51) Int. Cl.
*H04B 7/00* (2006.01)

(52) U.S. Cl.
USPC ......... 455/41.2; 455/41.1; 455/504; 455/505; 235/380; 709/217

(58) Field of Classification Search
USPC ............... 455/41.2, 41.1, 504, 505, 450, 451, 455/558, 556.1, 557, 417, 567; 235/380, 235/492; 709/217
See application file for complete search history.

(56) References Cited

U.S. PATENT DOCUMENTS

| 6,892,052 B2 * | 5/2005 | Kotola et al. | ................ 455/41.2 |
| 7,245,937 B2 * | 7/2007 | Maari | ........................... 455/558 |

(Continued)

FOREIGN PATENT DOCUMENTS

| EP | 1 530 115 A2 | 5/2005 |
| EP | 1 722 526 B1 | 11/2006 |

(Continued)

OTHER PUBLICATIONS

Gerd Kortuem, et al., "When Peer-to-Peer comes Face-to-Face: Collaborative Peer-to-Peer Computing in Mobile Ad hoc Networks", Peer-to-Peer Computing, 2001, Proceedings First International Conference on Linkoping, XP010583978, Aug. 27, 2001, pp. 75-91.

(Continued)

*Primary Examiner* — Minh D Dao
(74) *Attorney, Agent, or Firm* — Oblon, Spivak, McClelland, Maier & Neustadt, L.L.P.

(57) ABSTRACT

An information processing apparatus includes a first communication unit that receives management data including at least identification information of content data from a different device by using a first communication method. The apparatus also includes an output unit that outputs a first display based on the management information received by the first communication unit. Further, the apparatus includes a selection acceptation unit that accepts a selection of the content data according to a selection operation on the first display. The apparatus additionally includes a second communication that sends a request for the content data of which the selection acceptation unit accepts the selection to the different device and receives the content data corresponding to the request by using a second communication method whose communication range is wider than that of the first communication method.

18 Claims, 28 Drawing Sheets

(56) References Cited

U.S. PATENT DOCUMENTS

| | | | |
|---|---|---|---|
| 7,269,388 B2* | 9/2007 | Poursabahian et al. | 455/41.2 |
| 7,336,926 B2* | 2/2008 | Noda et al. | 455/41.2 |
| 7,336,928 B2* | 2/2008 | Paalasmaa et al. | 455/41.2 |
| 7,403,793 B2* | 7/2008 | Mauney et al. | 455/552.1 |
| 7,415,279 B2* | 8/2008 | Liang | 455/450 |
| 7,433,677 B2* | 10/2008 | Kantola et al. | 455/410 |
| 7,471,200 B2* | 12/2008 | Otranen | 340/572.1 |
| 7,478,069 B1* | 1/2009 | Ritter et al. | 705/52 |
| 7,545,795 B2* | 6/2009 | Hinsey | 370/350 |
| 7,565,108 B2* | 7/2009 | Kotola et al. | 455/41.2 |
| 7,643,798 B2* | 1/2010 | Ljung | 455/41.3 |
| 7,657,255 B2* | 2/2010 | Abel et al. | 455/414.1 |
| 7,675,537 B2* | 3/2010 | Wilson et al. | 348/14.01 |
| 7,693,542 B2* | 4/2010 | Mauney et al. | 455/552.1 |
| 7,801,486 B2* | 9/2010 | Barnier | 455/41.2 |
| 7,844,362 B2* | 11/2010 | Handfield et al. | 700/237 |
| 7,865,571 B2* | 1/2011 | Ho et al. | 709/217 |
| 7,882,531 B2* | 2/2011 | Yamagishi | 725/97 |
| 7,937,451 B2* | 5/2011 | Ho et al. | 709/217 |
| 7,941,169 B2* | 5/2011 | Son et al. | 455/504 |
| 7,945,211 B2* | 5/2011 | Duerdodt et al. | 455/63.1 |
| 7,970,350 B2* | 6/2011 | Sheynman et al. | 455/41.1 |
| 8,175,529 B2* | 5/2012 | Wakasa et al. | 455/41.2 |
| 8,588,691 B2* | 11/2013 | Wakasa et al. | 455/41.2 |
| 2003/0158785 A1* | 8/2003 | Erca | 705/26 |
| 2006/0206582 A1* | 9/2006 | Finn | 709/217 |
| 2006/0258289 A1* | 11/2006 | Dua | 455/41.3 |
| 2007/0083553 A1 | 4/2007 | Minor | |
| 2007/0097127 A1* | 5/2007 | Seo et al. | 345/473 |
| 2007/0189321 A1* | 8/2007 | Lee et al. | 370/445 |
| 2007/0239981 A1* | 10/2007 | Lessing | 713/164 |
| 2008/0002654 A1* | 1/2008 | Bolin | 370/339 |
| 2008/0095080 A1* | 4/2008 | Danzeisen et al. | 370/277 |
| 2008/0104219 A1* | 5/2008 | Kageyama et al. | 709/223 |
| 2008/0108391 A1* | 5/2008 | Vau et al. | 455/566 |
| 2008/0137862 A1* | 6/2008 | Morita et al. | 380/270 |
| 2008/0139125 A1* | 6/2008 | Son et al. | 455/67.11 |
| 2008/0165906 A1* | 7/2008 | Ho et al. | 375/354 |
| 2008/0186196 A1* | 8/2008 | Lessing | 340/686.6 |
| 2008/0195546 A1* | 8/2008 | Lilley | 705/59 |
| 2008/0198847 A1* | 8/2008 | Yamagishi et al. | 370/390 |
| 2008/0220878 A1* | 9/2008 | Michaelis | 463/42 |
| 2008/0248740 A1* | 10/2008 | Lazovsky et al. | 455/3.01 |
| 2009/0006626 A1* | 1/2009 | Yamagishi | 709/226 |
| 2009/0011753 A1* | 1/2009 | Barnier | 455/422.1 |
| 2009/0013087 A1* | 1/2009 | Lorch et al. | 709/232 |
| 2009/0037385 A1* | 2/2009 | Min et al. | 707/3 |
| 2009/0043783 A1* | 2/2009 | Wakasa et al. | 707/10 |
| 2009/0111378 A1* | 4/2009 | Sheynman et al. | 455/41.1 |
| 2010/0198944 A1* | 8/2010 | Ho et al. | 709/217 |
| 2011/0070825 A1* | 3/2011 | Griffin et al. | 455/41.1 |
| 2011/0070826 A1* | 3/2011 | Griffin et al. | 455/41.1 |
| 2011/0070827 A1* | 3/2011 | Griffin et al. | 455/41.1 |
| 2011/0070828 A1* | 3/2011 | Griffin et al. | 455/41.1 |
| 2011/0070829 A1* | 3/2011 | Griffin et al. | 455/41.1 |
| 2011/0093569 A1* | 4/2011 | Yamagishi | 709/219 |

FOREIGN PATENT DOCUMENTS

| | | |
|---|---|---|
| JP | 2001-128242 | 5/2001 |
| JP | 2001-128242 A | 5/2001 |
| JP | 2004-054023 | 2/2004 |
| JP | 2006-285716 | 10/2006 |
| JP | 2006-331155 | 12/2006 |
| JP | 2006-331155 A | 12/2006 |
| JP | 2007-058688 | 3/2007 |
| JP | 2007-58688 A | 3/2007 |
| JP | 2007-150984 | 6/2007 |
| JP | 2007-150984 A | 6/2007 |
| WO | WO 2005/034373 A2 | 4/2005 |
| WO | WO 2007/023120 A1 | 3/2007 |

OTHER PUBLICATIONS

Japanese Office Action issued Nov. 29, 2011, in Patent Application No. 2007-206709.

Japanese Office Action issued Sep. 19, 2013 in Patent Application No. 2012-050404.

Japanese Office Action issued Mar. 11, 2014 in Japanese Application No. 2012-050404, (no English translation), 3 pages.

* cited by examiner

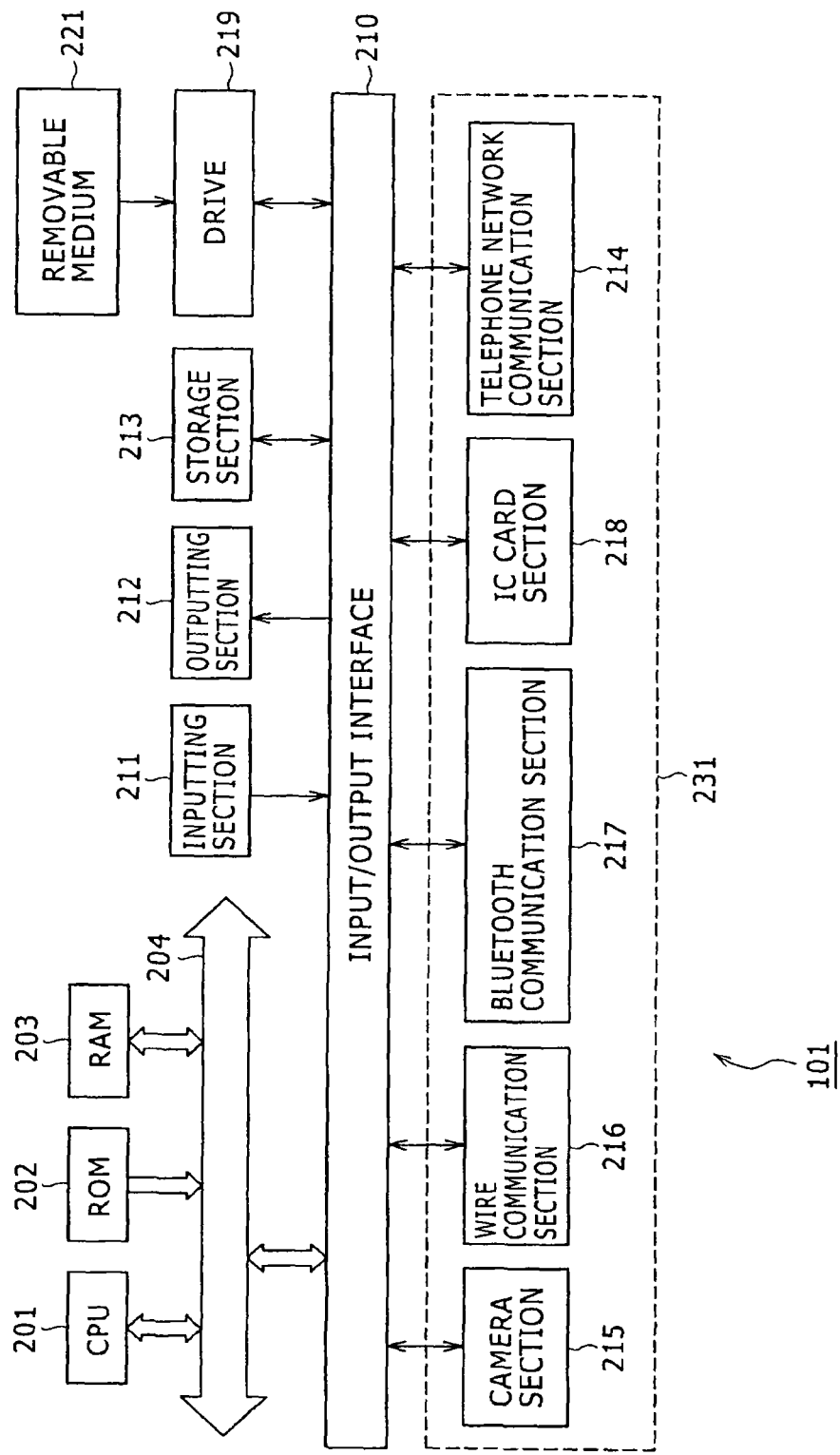

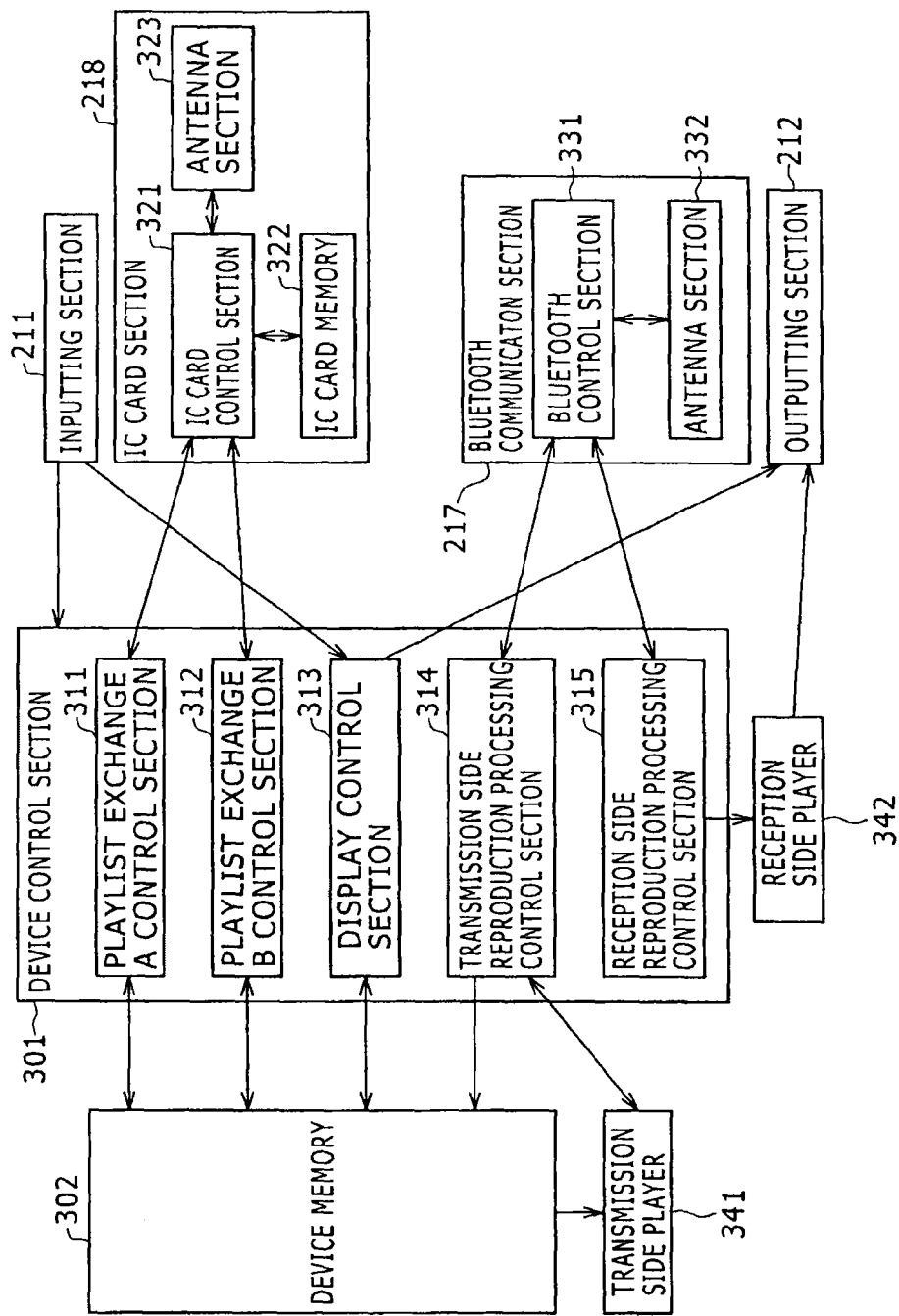

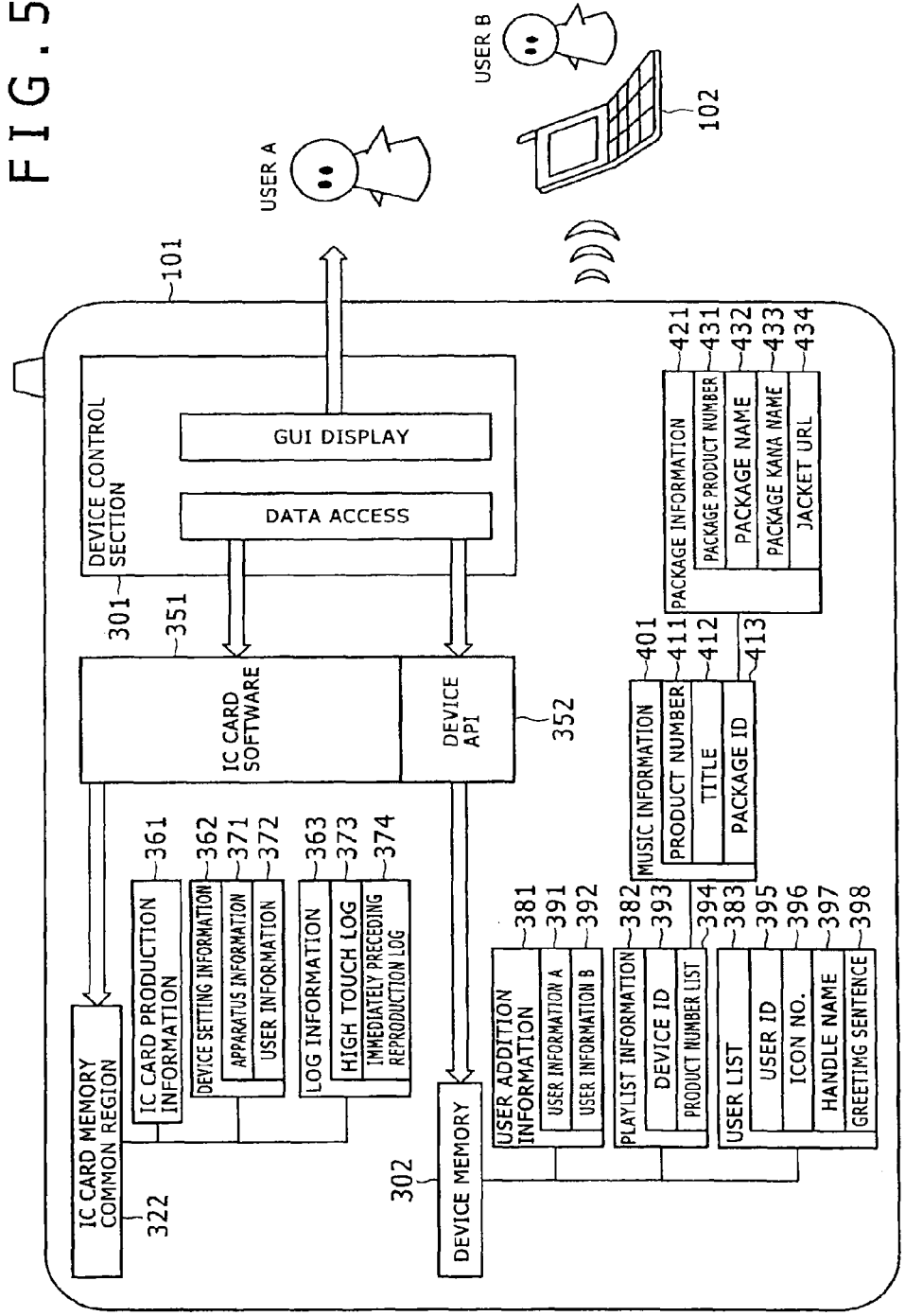

FIG. 6

| BLOCK | DATA ITEM | SUBSTANCE | CODE | SIGNIFICANCE (EXAMPLE) |
|---|---|---|---|---|
| APPARATUS INFORMATION Random 12Block | | | Max 192byte | |
| USER INFORMATION Random 6Block | INFORMATION DISCLOSURE LEVEL | INFORMATION DISCLOSURE LEVEL | BCD 1byte | HIGHER-ORDER 1 DIGIT (PLAYLIST EXCHANGE DIVISION) 0: NOT TO BE EXCHANGED, 1: TO BE EXCHANGED LOWER-ORDER 1 DIGIT (USER INFORMATION DISCLOSURE DIVISION) 0: NOT TO BE DISCLOSED, 1: TO BE DISCLOSED UP TO APPARATUS INFORMATION 2: TO BE DISCLOSED UP TO USER INFORMATION 3: TO BE DISCLOSED UP TO USER ADDITION INFORMATION A 4: TO BE DISCLOSED UP TO USER ADDITION INFORMATION B, ..., ETC. ... INFORMATION DESIGNATED BY GUI OPERATION OF USER |
| | DISCLOSURE ICON | ICON NUMBER | BCD 1byte | 00: STANDARD, 01 - 98: DEFAULT SET 99: USER PRODUCTION IMAGE |
| | HANDLE NAME | HANDLE NAME | 30byte | HANDLE NAME WHICH CAN BE DESIGNATED ARBITRARILY BY USER |
| | GREETING SENTENCE | GREETING SENTENCE | 64byte | GREETING SENTENCE WHICH CAN BE DESIGNATED ARBITRARILY BY USER |

FIG. 7

| CATEGORY | DATA ITEM | SUBSTANCE | CODE | SIGNIFICANCE (EXAMPLE) |
|---|---|---|---|---|
| USER ADDITION INFORMATION | USER INFORMATION A | SEX | HALF-WIDTH NUMERAL | 1: MALE, 2: FEMALE, 3: OTHER |
| | | BLOOD TYPE | HALF-WIDTH ENGLISH LETTER | A, B, O, AB |
| | | BIRTHDAY | HALF-WIDTH NUMERAL | YYYYMMDD |
| | | CONSTELLATION | HALF-WIDTH NUMERAL | 01-12 |
| | USER INFORMATION B | FULL NAME | CHARACTER | |
| | | KANA NAME | CHARACTER | |
| | | TELEPHONE NUMBER | HALF-WIDTH NUMERAL | |
| | | MAIL ADDRESS | HALF-WIDTH ALPHANUMERIC LETTER | |
| | | TELEPHONE NUMBER | HALF-WIDTH NUMERAL | |
| | | URL | HALF-WIDTH ALPHANUMERIC LETTER | |
| | | RSS | HALF-WIDTH ALPHANUMERIC LETTER | |

FIG. 8

| CATEGORY | DATA ITEM | SUBSTANCE | CODE | SIGNIFICANCE |
|---|---|---|---|---|
| PLAYLIST INFORMATION | DEVICE ID | DEVICE ID | ASCII 16byte | 16-DIGIT ALPHANUMERIC LETTERS BY ASCII CONVERSION OF 8bytes OF APPARATUS ID OF DEVICE |
| | PRODUCT NUMBER LIST | PRODUCT NUMBER | | LIST OF PRODUCT NUMBERS FOR UNIQUELY SPECIFYING MUSICAL COMPOSITION REPEATED BY NUMBER OF TIMES EQUAL TO NUMBER OF ELEMENTS OF LIST |

FIG. 9

| CATEGORY | DATA ITEM | SUBSTANCE | CODE | SIGNIFICANCE |
|---|---|---|---|---|
| MUSICAL COMPOSITION INFORMATION | PRODUCT NUMBER | PRODUCT NUMBER | | |
| | MUSICAL COMPOSITION TITLE | MUSICAL COMPOSITION TITLE | | |
| | KANA TITLE | KANA TITLE | | |
| | ARTIST NAME | ARTIST NAME | | |
| | ARTIST KANA NAME | ARTIST KANA NAME | | |
| | GENRE NAME | GENRE NAME | | |
| | MUSICAL COMPOSITION TIME | MUSICAL COMPOSITION TIME | | |
| | SOUND SOURCE PURCHASE DESTINATION URL | SOUND SOURCE PURCHASE DESTINATION URL | | |
| | EXTENDED URL | EXTENDED URL | | URL OF MUSICAL COMPOSITION EXPLANATION PARTICULAR PARTICULAR RSS ETC. REGARDING MUSICAL COMPOSITION INFORMATION |
| | PACKAGE ID | PACKAGE ID | | PRODUCT NUMBER FOR BUNDLING MUSICAL COMPOSITIONS |
| | REPRODUCTION TIME NUMBER | PRODUCTION TIME NUMBER | | |

FIG.10

| CATEGORY | DATA ITEM | SUBSTANCE | CODE | SIGNIFICANCE |
|---|---|---|---|---|
| PACKAGE INFORMATION | PACKAGE ID | PRODUCT NUMBER | | |
| | PACKAGE NAME | PACKAGE NAME | | |
| | PACKAGE KANA NAME | PACKAGE KANA | | |
| | STARTING DAY OF SALES | STARTING DATE OF SALES | | |
| | JACKET URL | JACKET URL | | |

FIG.17
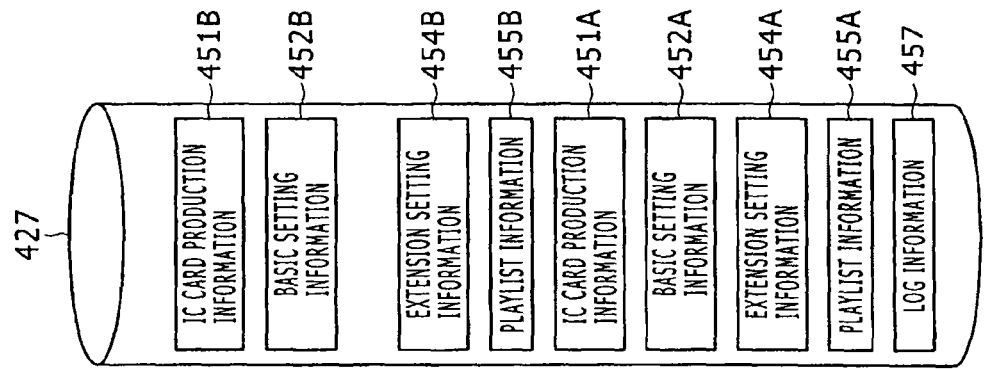
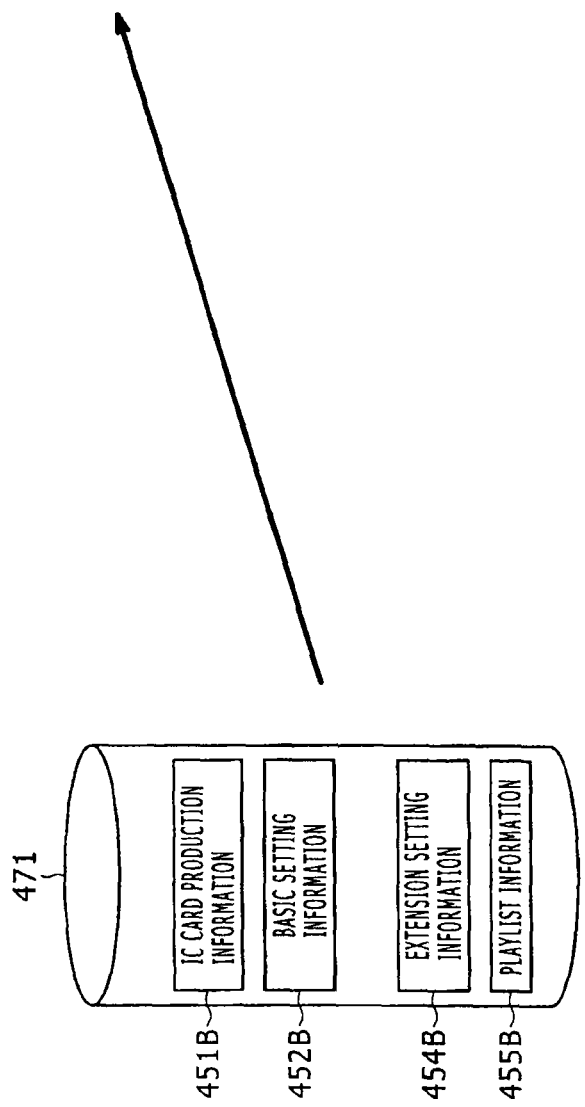

INFORMATION PROCESSING APPARATUS, AND METHOD AND INFORMATION PROCESSING SYSTEM

CROSS REFERENCES TO RELATED APPLICATIONS

This application is a continuation of and claims the benefit of priority under 35 U.S.C. §120 from U.S. Ser. No. 13/444,530, filed Apr. 11, 2012 which is a continuation of U.S. Ser. No. 12/182,418, filed Jul. 30, 2008 (Now U.S. Pat. No. 8,175,529), and claims the benefit of priority under 35 U.S.C. §119 from Japanese Patent Application JP 2007-206709 filed in the Japan Patent Office on Aug. 8, 2007, the entire contents of both of which being incorporated herein by reference.

BACKGROUND OF THE INVENTION

1. Field of the Invention

This invention relates to an information processing apparatus and method and an information processing system, and more particularly to an information processing apparatus and method and an information processing system by which information can be shared readily.

2. Description of the Related Art

A method of sharing information by carrying out communication between different apparatus using a predetermined communication method is in the past available and disclosed, for example, in Japanese Patent Laid-Open No. 2006-285716 (hereinafter referred to as Patent Document 1).

According to the method of Patent Document 1, when a user 12A creates a topic under a given title on an electronic bulletin board 33, a bulletin board server 31 permits different users 12B and 12C to write into the topic. When the different user 12B writes information of a content to be recommended into the topic along the title, a list indicative of the recommended content is outputted as a playlist to terminal apparatus 11A to 11D of the users 12A to 12D from which the bulletin board server 31 is accessed through a network 20. When a content included in the playlist is designated, a content server 32 outputs the designated content to the terminal apparatus of the user to which the playlist is outputted.

SUMMARY OF THE INVENTION

However, in order to share information, it is necessary to cause different users to recognize each other and exchange information regarding information to be shared, and complicated operation is requisite for setting for implementing information sharing.

Particularly in recent years, communication apparatus of the portable type such as portable telephone sets and PDAs (Personal Digital Assistants) have been popularized thanks to development of information processing technologies. Most of such portable communication apparatus are small in size and low in operability. Therefore, such setting operation as described above is more difficult with the portable communication apparatus. Further, since such portable communication apparatus have high portability, also the mobility of the apparatus themselves is high. Accordingly, the possibility that a portable communication apparatus may remain connected to one network for a long period of time is low, but the possibility that connection and disconnection of communication may be repeated to construct various networks with various opposite parties is high. In short, the updating frequency of the network or the communication apparatus to which the portable communication apparatus is connected is high, and there is the possibility that a cumbersome setting operation for information sharing may be demanded every time.

For example, in the case of the method of Patent Document 1, the electronic bulletin board is sometimes referred to in order to obtain information to be shared. Further, in order to enrich the information of the electronic bulletin board, it is necessary to write information into the electronic bulletin board. Furthermore, since the personality and so forth of a user who writes into the electronic bulletin board may not be grasped, there is the possibility that information inserted in the electronic bulletin board may not coincide with the intention of the user.

Where cumbersome operation is demanded for information sharing in this manner, not only the information sharing is merely difficult, but also there is the possibility that this may result in decline of the desire of a user for information sharing. Further, there is the possibility that the usage efficiency of each apparatus and each information may decline by declining the shared use of information.

Therefore, it is demanded to provide an information processing apparatus and method and an information processing system by which information can be shared readily.

According to an embodiment of the present invention, there is provided an information processing apparatus for sharing content data with a different apparatus which has the content data and management data including identification information of the content data and used for management of the content data, including management data acquisition means for controlling a first communication section, which carries out proximity radio communication according to a first communication method wherein the first communication section transfers information to and from the different apparatus while the different apparatus is positioned in the proximity of the information processing apparatus, to acquire the management data from the different apparatus, display control means for controlling a display section to display the management data acquired by the management data acquisition means as image information, selection operation acceptance means for accepting a selection operation of selecting the content data by selecting the management data displayed on the display section under the control of the display control means, requesting means for controlling a second communication section, which carries out short distance radio communication according to a second communication method different from the first proximity radio communication, to issue a request for the content data selected by the selection operation accepted by the selection operation acceptance means to the different apparatus, and content data acquisition means for controlling the second communication section to acquire the content data supplied in response to the request by the requesting means.

The information processing apparatus may further include storage control means for controlling a storage section to store the management data acquired by the management data acquisition means, the display control means reading out the management data stored in the storage section from the storage section under the control of the storage control means so as to be displayed as image information on the display section.

In this instance, the information processing apparatus may be configured such that the management data acquisition means further acquires identification information of the different apparatus from the different apparatus, and the storage control means controls the storage section to store the management data acquired by the management data acquisition means in an associated relationship with the identification information of the different apparatus.

In this instance, the information processing apparatus may be configured such that the display control means controls the second communication section to decide whether or not the different apparatus exists within a communication range according to the second communication method and controls, when the different apparatus does not exist within the communication range, the display section to display a display image of the management data stored in the associated relationship with the identification information of the different apparatus in the storage section in a changed form, and the selection operation acceptance means inhibits selection of the management data whose display image is displayed in the changed form under the control of the display control means.

The information processing apparatus may further include reproduction means for reproducing the content data acquired by the content data acquisition means.

The information processing apparatus may be configured such that the content acquisition means acquires the content data as streaming data, and the information processing apparatus further includes reproduction means for reproducing the streaming data.

The information processing apparatus may further include a storage section configured to store the content data and the management data for the content data, management data supplying means for controlling the first communication section to supply the management data to the different apparatus positioned in the proximity of the information processing apparatus by the proximity radio communication according to the first communication method, request acceptance means for controlling the second communication section to accept a request for content data supplied thereto from the different apparatus by the short distance radio communication according to the second communication method, and content data supplying means for reading out the content data requested by the request accepted by the request acceptance means from the storage section and controlling the second communication section to supply the read out content data to the different apparatus of the source of the request by the short distance radio communication according to the second communication method.

In this instance, the information processing apparatus may further include storage control means for controlling the storage section to store only that part of the management data acquired by the management data acquisition means at which the management data do not overlap with the management data stored in advance in the storage section.

According to another embodiment of the present invention, there is provided an information processing method for an information processing apparatus for sharing content data with a different apparatus which has the content data and management data including identification information of the content data and used for management of the content data, including the steps of controlling a first communication section, which carries out proximity radio communication according to a first communication method wherein the first communication section transfers information to and from the different apparatus while the different apparatus is positioned in the proximity of the information processing apparatus, to acquire the management data from the different apparatus, controlling a display section to display the acquired management data as image information, accepting a selection operation of selecting the content data by selecting the management data displayed on the display section, controlling a second communication section, which carries out short distance radio communication according to a second communication method different from the first proximity radio communication, to issue a request for the content data selected by the accepted selection operation to the different apparatus, and controlling the second communication section to acquire the content data supplied in response to the request by the requesting means.

In the information processing apparatus and the information processing method, the first communication section, which carries out proximity radio communication according to the first communication method wherein the first communication section transfers information to and from the different apparatus while the different apparatus is positioned in the proximity of the information processing apparatus, is controlled to acquire the management data from the different apparatus. Then, the display section displays the acquired management data as image information. Further, a selection operation of selecting the content data by selecting the management data displayed on the display section is accepted. Then, the second communication section, which carries out short distance radio communication according to the second communication method different from the first proximity radio communication, is controlled to issue a request for the content data selected by the accepted selection operation to the different apparatus. Further, the second communication section is controlled to acquire the content data supplied in response to the request.

According to a further embodiment of the present invention, there is provided an information processing apparatus for sharing content data with a different apparatus, including a storage section configured to store the content data and management data including identification information of the content data and used for management of the content data, management data supplying means for controlling a first communication section, which carries out proximity radio communication according to a first communication method wherein the first communication section transfers information to and from the different apparatus while the different apparatus is positioned in the proximity of the information processing apparatus, to supply the management data to the different apparatus, request acceptance means for controlling a second communication section, which carries out short distance radio communication according to a second communication method different from the first proximity radio communication, to accept a request for content data supplied thereto from the different apparatus, and content data supplying means for reading out the content data requested by the request accepted by the request acceptance means from the storage section and controlling the second communication section to supply the read out content data to the different apparatus of the source of the request.

According to a still further embodiment of the present invention, there is provided an information processing method for an information processing apparatus which includes a storage section in which content data and management data including identification information of the content data and used for management of the content data are stored in advance and which is configured to share content data with a different apparatus, including the steps of controlling a first communication section, which carries out proximity radio communication according to a first communication method wherein the first communication section transfers information to and from the different apparatus while the different apparatus is positioned in the proximity of the information processing apparatus, to supply the management data to the different apparatus, controlling a second communication section, which carries out short distance radio communication according to a second communication method different from the first proximity radio communication, to accept a request for content data supplied thereto from the different apparatus, and reading out the content data requested by the accepted request from the storage section and controlling the second communication section to supply the read out content data to the different apparatus of the source of the request.

In the information processing apparatus and the information processing method, the first communication section, which carries out proximity radio communication according to the first communication method wherein the first communication section transfers information to and from the different apparatus while the different apparatus is positioned in the proximity of the information processing apparatus, is controlled to supply the management data to the different apparatus. Then, the second communication section, which carries out short distance radio communication according to the second communication method different from the first proximity radio communication, is controlled to accept a request for content data supplied thereto from the different apparatus. Then, the content data requested by the accepted request are read out from the storage section, and the second communication section is controlled to supply the read out content data to the different apparatus of the source of the request.

According to a yet further embodiment of the present invention, there is provided an information processing system including first and second apparatus by which content data are to be shared, the first apparatus including management data acquisition means for controlling a first communication section, which carries out proximity radio communication according to a first communication method wherein the first communication section transfers information to and from the second apparatus while the second apparatus is positioned in the proximity of the first apparatus, to acquire management data including identification information of the content data and used for management of the content data, display control means for controlling a display section to display the management data acquired by the management data acquisition means as image information, selection operation acceptance means for accepting a selection operation of selecting the content data by selecting the management data displayed on the display section under the control of the display control means, requesting means for controlling a second communication section, which carries out short distance radio communication according to a second communication method different from the first proximity radio communication, to issue a request for the content data selected by the selection operation accepted by the selection operation acceptance means to the second apparatus, and content data acquisition means for controlling the second communication section to acquire the content data supplied in response to the request by the requesting means, and the second apparatus including a storage section configured to store the content data and the management data for the content data, management data supplying means for controlling a third communication section, which carries out the first proximity radio communication with the first apparatus positioned in the proximity of the second apparatus, to supply the management data read out from the storage section, request acceptance means for controlling a fourth communication section, which carries out the second short distance radio communication, to accept a request for content data supplied thereto from the first apparatus, and content data supplying means for reading out the content data requested by the request accepted by the request acceptance means from the storage section and controlling the fourth communication section to supply the read out content data to the first apparatus of the source of the request.

In the information processing system, in the first apparatus, the first communication section, which carries out proximity radio communication according to the first communication method wherein the first communication section transfers information to and from the second apparatus while the second apparatus is positioned in the proximity of the first apparatus, is controlled to acquire management data including identification information of the content data and used for management of the content data. Then, the management data acquired by the management data acquisition means are displayed as image information on the display section. Further, a selection operation of selecting the content data by selecting the management data displayed on the display section is accepted. Then, the second communication section, which carries out short distance radio communication according to the second communication method different from the first proximity radio communication, is controlled to issue a request for the selected content data. Further, the second communication section is controlled to acquire the content data supplied in response to the request. On the other hand, in the second apparatus, the third communication section, which carries out the first proximity radio communication with the first apparatus positioned in the proximity of the second apparatus, is controlled to supply the management data read out from the storage section. Then, the fourth communication section, which carries out the second short distance radio communication, is controlled to accept a request for content data supplied thereto from the first apparatus. Further, the content data requested by the accepted request are read out from the storage section, and the fourth communication section is controlled to supply the read out content data to the first apparatus of the source of the request.

With the information processing apparatus and methods and the information processing system, information can be shared. Particularly, information can be shared readily.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a block diagram showing an example of an internal configuration of a portable telephone set shown in FIG. 1;

FIG. 4 is a functional block diagram showing an example of functional blocks which the portable telephone set has;

FIG. 5 is a diagrammatic view illustrating an example of a configuration of data which the portable telephone set has;

FIG. 6 is a view illustrating an example of device setting information;

FIG. 7 is a view illustrating an example of user addition information;

FIG. 8 is a view illustrating an example of playlist information;

FIG. 9 is a view illustrating an example of musical composition information;

FIG. 10 is a view illustrating an example of package information;

FIGS. 16 and 17 are diagrammatic views illustrating a manner of data stored in different portable telephone sets used in the network system;

DETAILED DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 23:
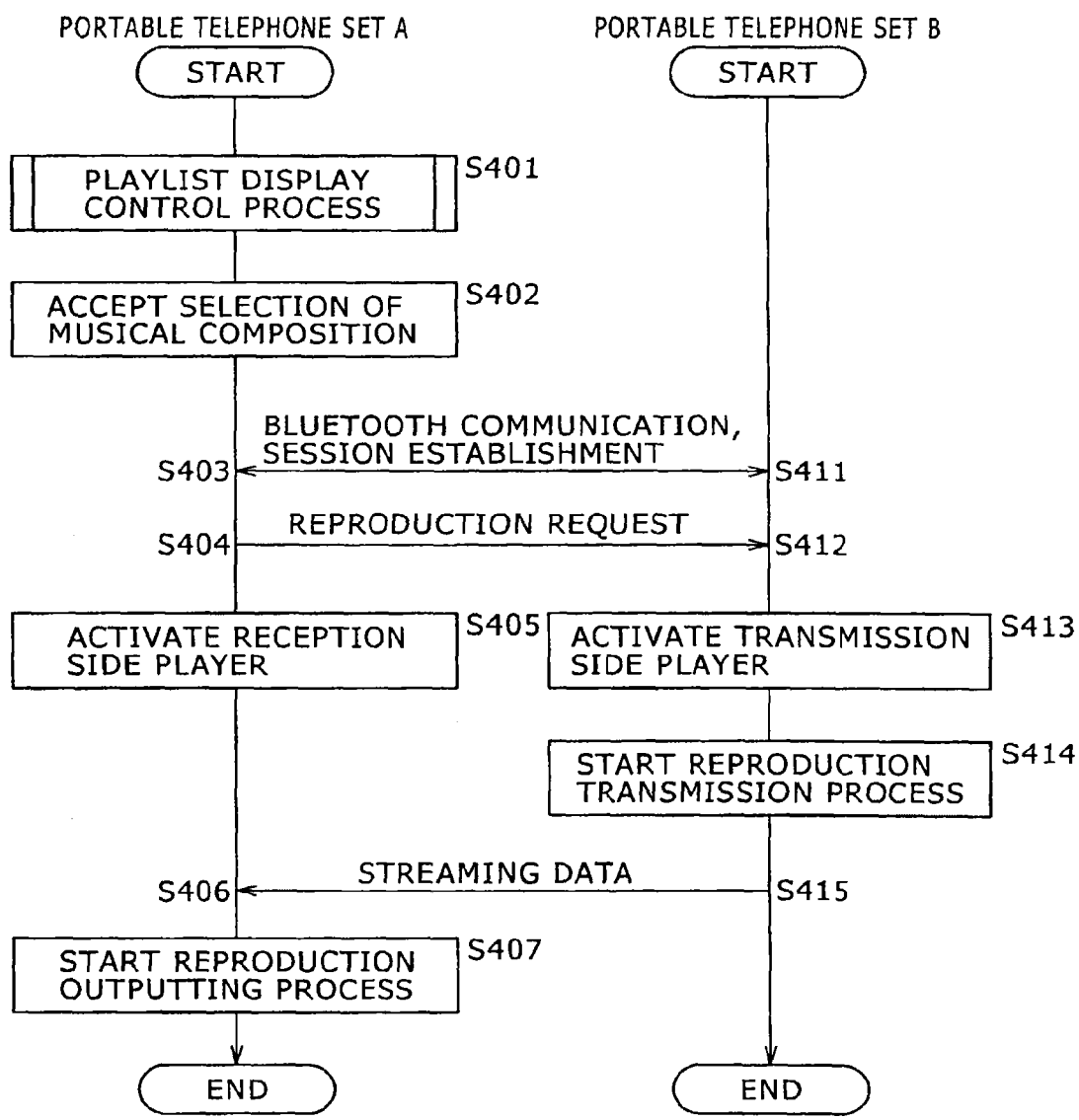
FIG. 23 is a flow chart illustrating an outline of music data sharing.

According to an embodiment of the present invention, there is provided an information processing apparatus (for example, a portable telephone set 101 of FIG. 1) for sharing content data (for example, music data B of FIGS. 3A to 3C) with a different apparatus (for example, a portable telephone set B of FIGS. 3A to 3C) which has the content data and management data (for example, a playlist B of FIGS. 3A to 3C) including identification information of the content data and used for management of the content data, including management data acquisition means (for example, a playlist exchange A control section 311 of FIG. 4 which executes a process at step S106 of FIG. 11) for controlling a first communication section (for example, an IC card section 218 of FIG. 2), which carries out proximity radio communication according to a first communication method wherein the first communication section transfers information to and from the different apparatus while the different apparatus is positioned in the proximity of the information processing apparatus, to acquire the management data from the different apparatus, display control means (for example, the playlist exchange A control section 311 of FIG. 4 which executes a process at step S432 of FIG. 24) for controlling a display section (for example, an outputting section 212 of FIG. 4) to display the management data acquired by the management data acquisition means as image information, selection operation acceptance means (for example, the playlist exchange A control section 311 of FIG. 4 which executes a process at step S402 of FIG. 23) for accepting a selection operation of selecting the content data by selecting the management data displayed on the display section under the control of the display control means, requesting means (for example, a reception side reproduction processing control section 315 of FIG. 4 which executes a process at step S404 of FIG. 23) for controlling a second communication section (for example, a Bluetooth communication section 217 of FIG. 2), which carries out short distance radio communication according to a second communication method different from the first proximity radio communication, to issue a request for the content data selected by the selection operation accepted by the selection operation acceptance means to the different apparatus, and content data acquisition means (for example, the reception side reproduction processing control section 315 of FIG. 4 which executes a process at step S406 of FIG. 23) for controlling the second communication section to acquire the content data supplied in response to the request by the requesting means.

The information processing apparatus may further include storage control means (for example, the playlist exchange A control section 311 of FIG. 4 which executes a process at step S266 of FIG. 19) for controlling a storage section (for example, a device memory 302 of FIG. 4) to store the management data acquired by the management data acquisition means, the display control means reading out the management data stored in the storage section from the storage section under the control of the storage control means so as to be displayed as image information on the display section.

In this instance, the information processing apparatus may be configured such that the management data acquisition means further acquires identification information (for example, IC card production information 451 of FIG. 11) of the different apparatus from the different apparatus, and the storage control means controls the storage section to store the management data acquired by the management data acquisition means in an associated relationship with the identification information of the different apparatus.

Figure 24:
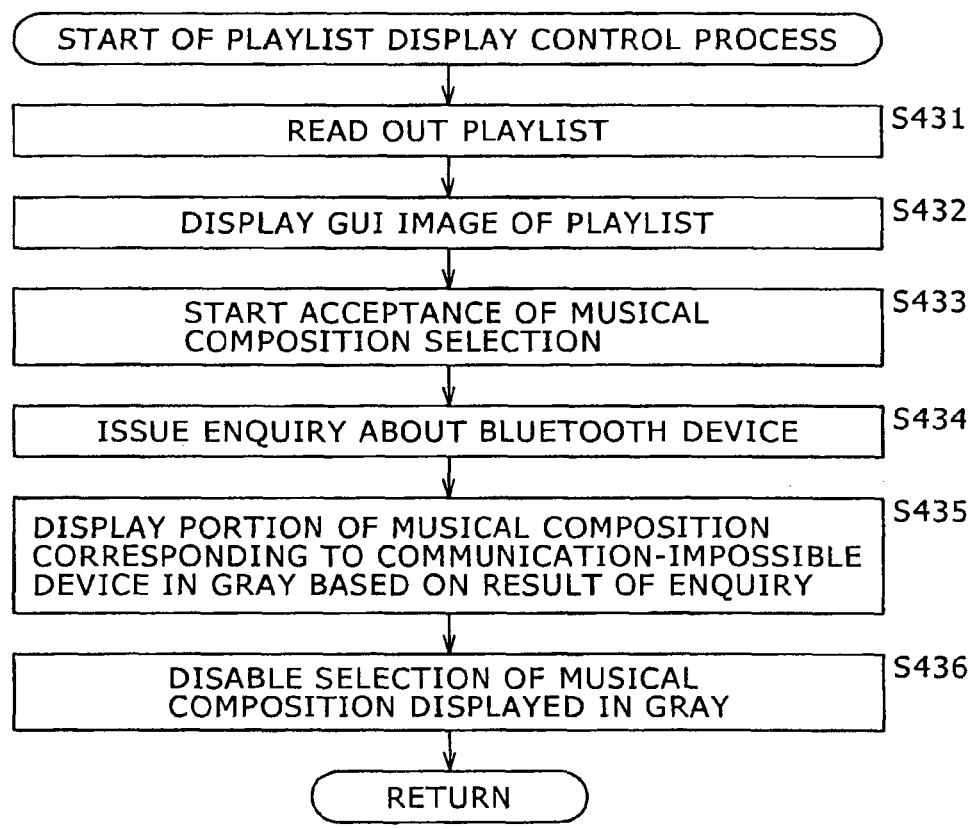
FIG. 24 is a flow chart illustrating an example of a flow of a playlist display control process.

In this instance, the information processing apparatus may be configured such that the display control means controls the second communication section to decide whether or not the different apparatus exists within a communication range according to the second communication method and controls, when the different apparatus does not exist within the communication range, the display section to display a display image of the management data stored in the associated relationship with the identification information of the different apparatus in the storage section in a changed form (for example, at step S435 of FIG. 24), and the selection operation acceptance means inhibits selection of the management data whose display image is displayed in the changed form under the control of the display control means (for example, at step S436 of FIG. 24).

The information processing apparatus may further include reproduction means (for example, a reception side player 342 of FIG. 4) for reproducing the content data acquired by the content data acquisition means.

The information processing apparatus may be configured such that the content acquisition means acquires the content data as streaming data, and the information processing apparatus further includes reproduction means (for example, the reception side player 342 of FIG. 4) for reproducing the streaming data.

The information processing apparatus may further include a storage section (for example, the device memory 302 of FIG. 4) for storing the content data and the management data for the content data, management data supplying means (for example, the playlist exchange A control section 311 of FIG. 4 which executes a process at step S276 of FIG. 19) for controlling the first communication section to supply the management data to the different apparatus positioned in the proximity of the information processing apparatus by the proximity radio communication according to the first communication method, request acceptance means (for example, a transmission side reproduction processing control section 314 of FIG. 4 which executes a process at step S412 of FIG. 23) for accepting a request for content data supplied thereto from the different apparatus by the short distance radio communication according to the second communication method, and content data supplying means (for example, the transmission side reproduction processing control section 314 of FIG. 4 which executes a process at step S415 of FIG. 23) for reading out the content data requested by the request accepted by the request acceptance means from the storage section and controlling the second communication section to supply the read out content data to the different apparatus of the source of the request by the short distance radio communication according to the second communication method.

In this instance, the information processing apparatus may further include storage control means (for example, the playlist exchange A control section 311 of FIG. 4 which executes a process at step S266 of FIG. 19) for controlling the storage section to store only that part of the management data acquired by the management data acquisition means at which the management data do not overlap with the management data stored in advance in the storage section.

According to another embodiment of the present invention, there is provided an information processing method for an information processing apparatus for sharing content data with a different apparatus which has the content data and management data including identification information of the content data and used for management of the content data, including the steps of controlling a first communication section, which carries out proximity radio communication according to a first communication method wherein the first communication section transfers information to and from the different apparatus while the different apparatus is positioned in the proximity of the information processing apparatus, to acquire the management data from the different apparatus (for example, at step S106 of FIG. 11), controlling a display section to display the acquired management data as image information (for example, at step S432 of FIG. 24), accepting a selection operation of selecting the content data by selecting the management data displayed on the display section (for example, at step S402 of FIG. 23), controlling a second communication section, which carries out short distance radio communication according to a second communication method different from the first proximity radio communication, to issue a request for the content data selected by the accepted selection operation to the different apparatus (for example, at step S404 of FIG. 23), and controlling the second communication section to acquire the content data supplied in response to the request by the requesting means (for example, at step S406 of FIG. 23).

Figure 21:
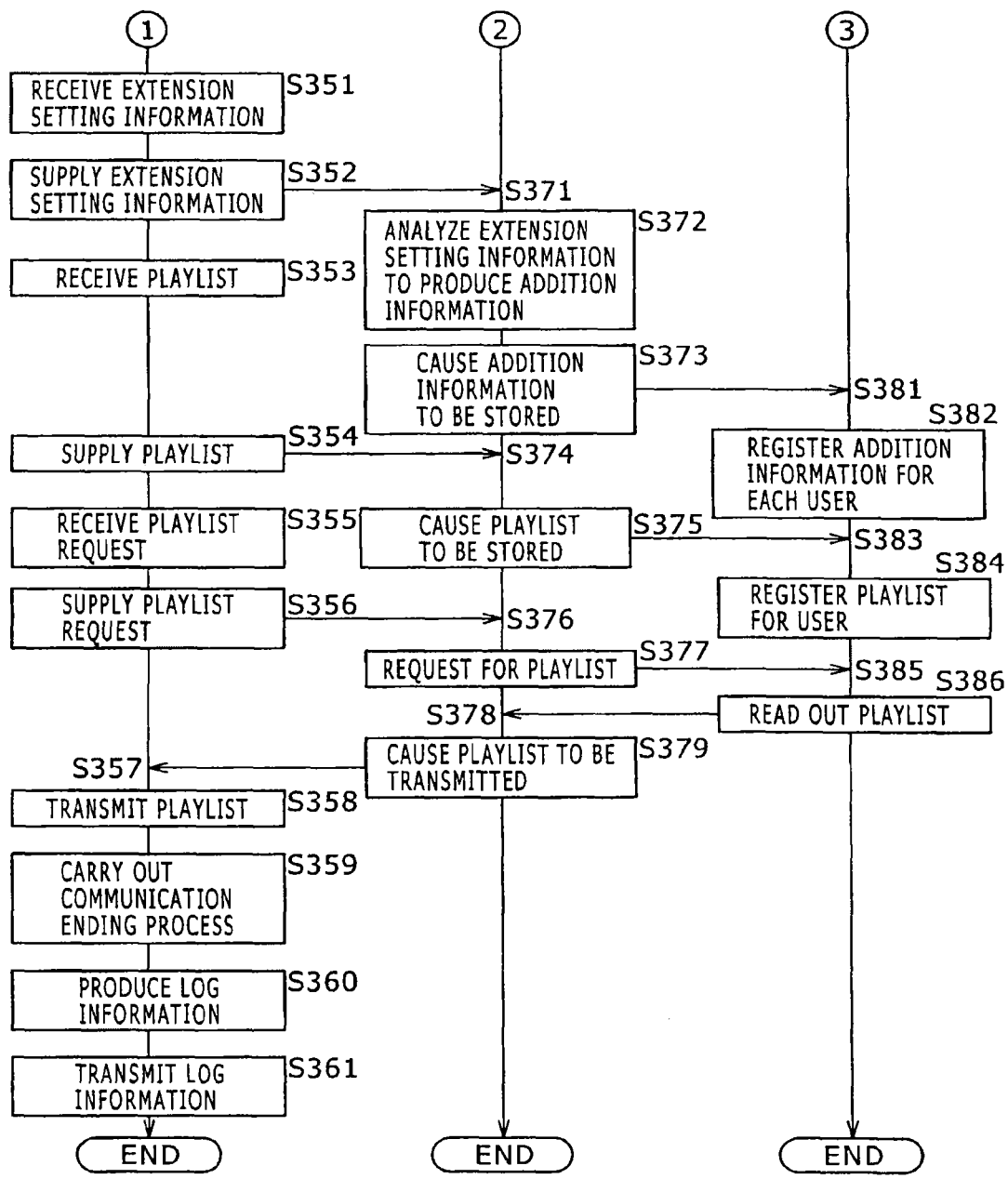

According to a further embodiment of the present invention, there is provided an information processing apparatus (for example, a portable telephone set 101 of FIG. 1) for sharing content data (for example, music data B of FIGS. 3A to 3C) with a different apparatus (for example, a portable telephone set B of FIGS. 3A to 3C), including a storage section (for example, a device memory 302 of FIG. 4) for storing the content data and management data (for example, a playlist B of FIGS. 3A to 3C) including identification information of the content data and used for management of the content data, management data supplying means (for example, a playlist exchange B control section 312 which executes a process at step S371 of FIG. 21) for controlling a first communication section (for example, an IC card section 218 of FIG. 2), which carries out proximity radio communication according to a first communication method wherein the first communication section transfers information to and from the different apparatus while the different apparatus is positioned in the proximity of the information processing apparatus, to supply the management data to the different apparatus, request acceptance means (for example, a transmission side reproduction processing control section 314 of FIG. 4 which executes a process at step S412 of FIG. 23) for controlling a second communication section (for example, a Bluetooth communication section 217 of FIG. 2), which carries out short distance radio communication according to a second communication method different from the first proximity radio communication, to accept a request for content data supplied thereto from the different apparatus, and content data supplying means (for example, the transmission side reproduction processing control section 314 of FIG. 4 which executes a process at step S415 of FIG. 23) for reading out the content data requested by the request accepted by the request acceptance means from the storage section and controlling the second communication section to supply the read out content data to the different apparatus of the source of the request.

According to a still further embodiment of the present invention, there is provided an information processing method for an information processing apparatus which includes a storage section in which content data and management data including identification information of the content data and used for management of the content data are stored in advance and which is configured to share content data with a different apparatus, including the steps of controlling a first communication section, which carries out proximity radio communication according to a first communication method wherein the first communication section transfers information to and from the different apparatus while the different apparatus is positioned in the proximity of the information processing apparatus, to supply the management data to the different apparatus (for example, at step S371 of FIG. 21), controlling a second communication section, which carries out short distance radio communication according to a second communication method different from the first proximity radio communication, to accept a request for content data supplied thereto from the different apparatus (for example, at step S412 of FIG. 23), and reading out the content data requested by the accepted request from the storage section and controlling the second communication section to supply the read out content data to the different apparatus of the source of the request (for example, at step S415 of FIG. 23).

According to a yet further embodiment of the present invention, there is provided an information processing system (for example, a network system 100 of FIG. 1) including first and second apparatus (for example, portable telephone sets A and B of FIGS. 3A to 3C, respectively) by which content data (for example, music data A and B of FIGS. 3A to 3C) are to be shared, the first apparatus including management data acquisition means (for example, a playlist exchange A control section 311 of FIG. 4 which executes a process at step S106 of FIG. 11) for controlling a first communication section (for example, an IC card section 218 of FIG. 2), which carries out proximity radio communication according to a first communication method wherein the first communication section transfers information to and from the second apparatus while the second apparatus is positioned in the proximity of the first apparatus, to acquire management data including identification information of the content data and used for management of the content data, display control means (for example, the playlist exchange A control section 311 of FIG. 4 which executes a process at step S432 of FIG. 24) for controlling a display section (for example, an outputting section 212 of FIG. 4) to display the management data acquired by the management data acquisition means as image information, selection operation acceptance means (for example, the playlist exchange A control section 311 of FIG. 4 which executes a process at step S402 of FIG. 23) for accepting a selection operation of selecting the content data by selecting the management data displayed on the display section under the control of the display control means, requesting means (for example, a reception side reproduction processing control section 315 of FIG. 4 which executes a process at step S404 of FIG. 23) for controlling a second communication section (for example, a Bluetooth communication section 217 of FIG. 2), which carries out short distance radio communication according to a second communication method different from the first proximity radio communication, to issue a request for the content data selected by the selection operation accepted by the selection operation acceptance means to the second apparatus, and content data acquisition means (for example, the reception side reproduction processing control section 315 of FIG. 4 which executes a process at step S406 of FIG. 23) for controlling the second communication section to acquire the content data supplied in response to the request by the requesting means, the second apparatus including a storage section (for example, the device memory 302 of FIG. 4) for storing the content data and the management data for the content data, management data supplying means (for example, a playlist exchange B control section 312 of FIG. 4 which executes a process at step S371 of FIG. 21) for controlling a third communication section (for example, an IC card section 218 of FIG. 2), which carries out the first proximity radio communication with the first apparatus positioned in the proximity of the second apparatus, to supply the management data read out from the storage section, request acceptance means (for example, a transmission side reproduction processing control section 314 of FIG. 4 which executes a process at step S412 of FIG. 23) for controlling a fourth communication section (for example, the Bluetooth communication section 217 of FIG. 2), which carries out the second short distance radio communication, to accept a request for content data supplied thereto from the first apparatus, and content data supplying means (for example, the transmission side reproduction processing control section 314 of FIG. 4 which executes a process at step S415 of FIG. 23) for reading out the content data requested by the request accepted by the request acceptance means from the storage section and controlling the fourth communication section to supply the read out content data to the first apparatus of the source of the request.

In the following, a preferred embodiment of the present invention is described.

Figure 1:
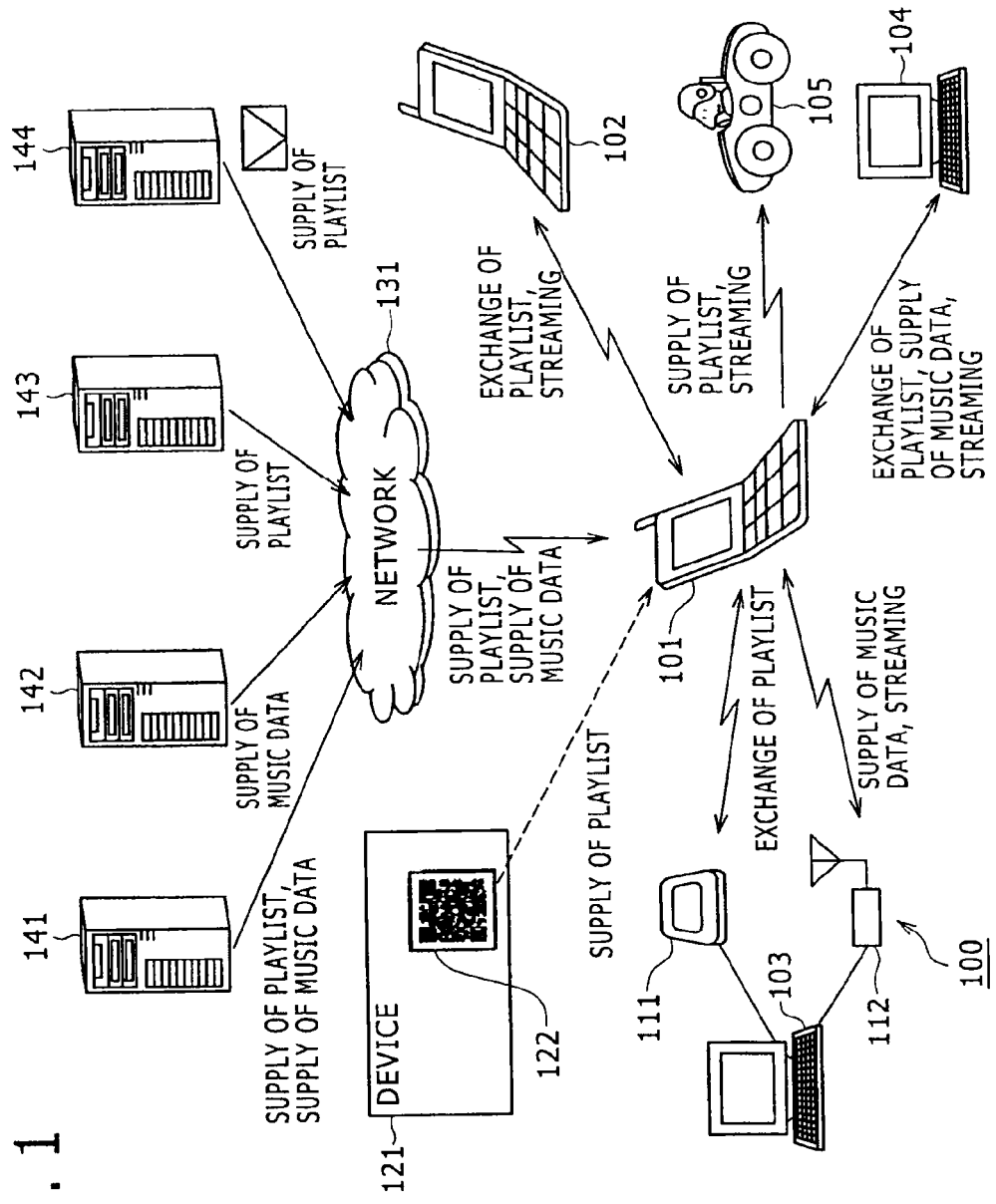
FIG. 1 is a schematic view showing an example of a configuration of a network system to which the present invention is applied.

FIG. 1 shows an example of a configuration of a network system to which the present invention is applied.

Referring to FIG. 1, the network system 100 shown is composed of a plurality of apparatus and allows information to be shared readily between different apparatus. In particular, a terminal apparatus of the network system 100 causes music data which a different apparatus has to be transmitted as streaming data of a format in which the music data can be reproduced sequentially while they are acquired, that is, to be streaming reproduced. Then, while the terminal apparatus acquires the streaming data, it outputs the streaming data as sound. On the contrary, the terminal apparatus streaming reproduces music data owned by the terminal apparatus itself and supplies the streaming data to a different apparatus such that the music data are outputted sequentially as sound from the different apparatus. In short, the network system 100 allows sharing of music data.

The music data is content data obtained by conversion of a sound signal of music which is a content. Naturally, the music data is not restricted in terms of the number, substance, time, sound volume, data amount and other features of musical compositions. The music data may have any substance. It is to be noted that a musical composition here may include not only play sound of a musical instrument but also any sound signal including voice of a human being, sound of the natural world and artificially created sound. Although music data is sold as hereinafter described, basically it is sold in a unit of a musical composition. It is to be noted that a plurality of musical compositions may be sold collectively as a package.

Components of the network system 100 between which music data are shared transfer or exchange data called playlist. A playlist is metadata or relating information including the substance or a musical composition of music data which are shared, that is, shared data and information relating to the data themselves and is management data utilized for management of content data. Although details are hereinafter described, the playlist includes identification information of a musical composition such as an ID or the title.

Although details are hereinafter described, a transferred playlist is displayed, for example, as a GUI (Graphical User Interface). If the user selects a musical composition to be reproduced from within the playlist, then streaming reproduction of the selected musical composition, that is, sharing of music data, is carried out.

A portable telephone set 101 shown in FIG. 1 is a terminal apparatus of the network system 100 by which such sharing of music data as described above is carried out. The portable telephone set 101 has a communication function of establishing a connection to a public telephone network through a base station using a radio communication function thereof to carry out music communication with a different telephone set. The portable telephone set 101 further has a packet communication function of establishing a connection to the Internet through the public telephone network to carry out packet communication with a different communication apparatus. The portable telephone set 101 can utilize the packet communication function to establish a connection to and communicate with, for example, a WEB server 141, a music selling server 142, an SNS server 143, a mail distribution server 144 or the like through a network 131 formed from one or a plurality of networks such as a public telephone network or the Internet.

For example, the portable telephone set 101 can establish a connection to the WEB server 141 to acquire or receive supply of a playlist or music data from a WEB site provided by the WEB server 141. Further, the portable telephone set 101 can establish a connection, for example, to the music selling server 142 to purchase and acquire music data of a music selling site provided by the music selling server 142. Furthermore, the portable telephone set 101 can log in an SNS (Social Network Site) provided by the SNS server 143 to acquire a playlist provided by a different user or a manager from the SNS. Further, the portable telephone set 101 can acquire an electronic mail distributed from the mail distribution server 144 and having a playlist described therein or having a playlist annexed thereto.

Further, the portable telephone set 101 has a digital camera function of picking up an image of an image pickup object and obtain image data of the picked up image, and a QR code decoding function of decoding a QR (Quick Response) code, which is a two-dimensional code symbol picked up by the digital camera function to obtain information included in the QR code. The portable telephone set 101 can utilize the digital camera function to pick up an image of a QR code 122 printed or displayed on a device 121 shown in FIG. 1 and utilize the QR code decoding function to extract and retain a playlist included in the picked up QR code 122. For example, if a playlist is extracted by the QR code decoding function, then an application for sharing music data is started, and an extracted playlist is stored into and managed in a storage section.

It is to be noted that the device 121 may be any device only if it presents the QR code 122 and may be, for example, a wall of a building, a housing of an apparatus, a printed matter such as a poster or a magazine, a monitor such as an LCD (Liquid Crystal Display) apparatus or an organic EL (Electroluminescence) display apparatus.

The portable telephone set 101 further has a wire communication function of communicating with another apparatus connected thereto by a wire connection using predetermined wire communication standards represented, for example, by the USB (Universal Serial Bus) or the IEEE (Institute of Electrical and Electronic Engineers) 1394. The portable telephone set 101 can use the wire communication function to communicate with a personal computer 104 (hereinafter referred to as PC 104) connected to the portable telephone set 101 by a wire connection. For example, the portable telephone set 101 can acquire a playlist or music data from the PC 104 connected by a wire connection thereto through a communication cable.

Consequently, the portable telephone set 101 can readily acquire music data purchased through and accumulated in the PC 104 or music data produced using the PC 104, a playlist of such music data and so forth.

It is to be noted that the method of acquiring a playlist or music data may be any other than the method described above. For example, a playlist or music data may be transferred through a removable medium such as a flash memory. The portable telephone set 101 can also produce a playlist of music data retained therein in accordance with a user instruction or automatically in accordance with a predetermined condition.

As described above, the portable telephone set 101 can acquire a playlist or music data readily by an arbitrary method.

The portable telephone set 101 stores the playlist or music data acquired in such a manner as described above as data which belong to the portable telephone set 101 itself. The portable telephone set 101 can exchange playlists with a different apparatus to transfer music data owned by them as streaming data based on the playlists. In short, the portable telephone set 101 and the different apparatus substantially share the music data or musical compositions.

It is to be noted that the portable telephone set 101 need not necessarily store music data of musical compositions corresponding to a playlist to be exchanged.

For example, the playlist of the portable telephone set 101 may include information of supplying sources of musical compositions or music data corresponding thereto. For example, the playlist may include the URL (Uniform Resource Locator) of a site from which the music data are provided. In such an instance, since the portable telephone set 101 can acquire a musical composition or music data corresponding to the playlist at an arbitrary timing in principle based on the information mentioned, this is, to the portable telephone set 101, substantially equivalent to the fact that the music data are stored in the portable telephone set 101. Accordingly, the portable telephone set 101 can exchange such a playlist as described above with a different apparatus.

It is to be noted, however, that, since the portable telephone set 101 does not actually have music data stored therein, it may not carry out streaming data immediately. Accordingly, when a reproduction instruction is received, preferably the portable telephone set 101 acquires the music data, or such reproduction request for music data is inhibited.

It is to be noted that the portable telephone set 101 is basically in a state wherein it does not store the playlist acquired from the opposite party of exchange of playlists nor musical compositions or music data corresponding to the playlist, that is, the musical compositions or music data are stored in or can be acquired by the opposite party apparatus. The portable telephone set 101 inhibits exchange of the playlist acquired by the exchange with the different apparatus with a further apparatus. In other words, the portable telephone set 101 does not set a play apparatus acquired by exchange and belonging to another apparatus as an object of exchange. To this end, the portable telephone set 101 manages a playlist acquired by exchange in an associated relationship with the opposite party of the exchange and distinguishes the playlist from a playlist acquired from any other apparatus by exchange as well as from the playlist belonging to the portable telephone set 101 itself.

The portable telephone set 101 has an IC card function of the contactless type, a reader/writer function for an IC card, and a Bluetooth communication function.

The IC card is a device of the card type which includes a built-in IC chip or semiconductor integrated circuit for storage of information and mathematical operation and can record information into the IC chip. Usually, the IC card can record data of a greater amount than a magnetic card and is higher in security against falsification of data and forgery of the card, and is applied, for example, to an electronic money and a telephone card. The IC card communicates with a compatible reader/writer to supply information stored in the IC chip to the reader/writer or store data supplied from the reader/writer into the IC chip. An IC card of the contactless type makes use of wireless or radio communication to carry out transfer or communication of such data without contacting with the device. Thus, the IC card of the contactless type (and the reader/writer) has an antenna for wireless communication in addition to the IC chip.

The IC card function signifies such functions of an IC card as described above, that is, the radio communication function, data retaining function, information processing function and so forth. In other words, the portable telephone set 101 has a built-in configuration of an IC card. Although details are hereinafter described, the portable telephone set 101 not only has a built-in IC card but also allows transfer of data between the IC card and the other components thereof and cooperation of the IC card and the other components to execute processing.

The communication distance of the radio communication of the IC card function does not have any particular limitation but may be any distance. For example, the IC card function may be not of the contactless type but of the contact type, or in other words, the communication distance may be 0 m. In the following, it is assumed that the communication distance is a very short distance of approximately 10 cm or less. A contactless IC card having a very short communication distance has been popularized most at present and can be developed readily. Further, since the contactless IC card can communicate in a contactless condition, it is easy to maintain the posture thereof during communication and stabilized communication can be implemented readily. Furthermore, since the communication distance is limited to the very short distance, it is easy to specify the opposite party of the communication, and besides since operation for execution of the communication is clear, occurrence of unintended communication can be reduced.

The reader/writer function for an IC card is one of functions which the reader/writer described above has and is a function of reading out information stored in the IC card and writing information into the IC card.

Generally, an IC card can communicate only with a reader/writer, but may not communicate with another IC card. In other words, in the very short distance radio communication, one of the parties of the communication has to have a reader/writer function. The portable telephone set 101 has both of the IC card function and the reader/writer function. In particular, the portable telephone set 101 can supply information retained by the IC card function to another reader/writer or another device having the reader/writer function. Further, the portable telephone set 101 can use the reader/writer function to read out information from another IC card or another device having the IC card function.

The Bluetooth function is a function of carrying out Bluetooth communication which is one of short distance radio communication techniques. It is to be noted that the short distance here signifies a distance shorter than approximately 10 m. Thus, the Bluetooth function has a communication distance longer than that of the very short distance radio communication by the IC card function or reader/writer function. Accordingly, the degree of freedom in the position and the posture of the portable telephone set 101 is enhanced in comparison with that based on communication by the IC card function. Further, the Bluetooth function is generally higher in communication speed than the IC card function and can transfer a large amount of data in a shorter period of time.

The portable telephone set 101 exchanges or transfers playlists to and from a different apparatus by the very short distance radio communication by the IC card function and the reader/writer function. Further, the portable telephone set 101 carries out sharing of music data with a different apparatus using the Bluetooth communication function, that is, transfer of streaming data to and from a different apparatus.

For example, the portable telephone set 101 can carry out exchange of playlists and sharing of music data with another portable telephone set 102 having similar functions. In the portable telephone set 102, a playlist and music data acquired by a similar method to that by the portable telephone set 101 described hereinabove are stored as data belonging to the portable telephone set 102. The portable telephone set 101 and the portable telephone set 102 can exchange their playlists by the very short distance radio communication using the IC card function (and the reader/writer function) and share music data by Bluetooth communication.

Further, for example, the portable telephone set 101 can carry out exchange of playlists and sharing of music data with a personal computer 103 (hereinafter referred to as PC 103) having a reader/writer 111 compatible with the IC card function which the portable telephone set 101 has and a Bluetooth communication section 112 (hereinafter referred to as BT communication section 112) having the Bluetooth function. The portable telephone set 101 can exchange playlists with the PC 103 through the reader/writer 111. Further, the portable telephone set 101 can share music data with the PC 103 by communicating streaming data through the BT communication section 112.

Further, for example, the portable telephone set 101 can supply a playlist to an audio device 105 for a car audio system or the like and can supply streaming data of music data stored in the portable telephone set 101 to the audio device 105 having a high output performance so that sound can be outputted from the audio device 105.

Though not shown, the audio device 105 has a reader/writer function compatible with the IC card function which the portable telephone set 101 has, and a Bluetooth communication function. The portable telephone set 101 uses the IC card function to supply the playlist thereof to the audio device 105 by the very short distance radio communication. If the user operates the audio device 105 to select music data stored in the portable telephone set 101 from within the playlist displayed as a GUI image, then streaming data of the music data is supplied from the portable telephone set 101 to the audio device 105 by the Bluetooth communication function. In this manner, when the portable telephone set 101 reproduces music data stored in the portable telephone set 101, sound of high quality can be outputted from the audio device 105 of a high performance.

While, in the foregoing description, exchange of playlists is carried out by the very short distance radio communication using the IC card and the reader/writer function and transfer of streaming data of music data is carried out by the short distance radio communication using the Bluetooth communication function, exchange of playlists or transfer of streaming data of music data may be carried out using any communication function. For example, the portable telephone set 101 may exchange playlists with a different device connected thereto by a wire connection by wire communication. In particular, the portable telephone set 101 can exchange playlists with the PC 104 connected thereto by wire connection and transfer streaming data of music data.

By sharing music data between different apparatus or users in such a manner as described above, information property such as a playlist and music data can be utilized effectively.

For example, since a playlist is information of musical compositions basically collected by a user, it is also liking information of the user. Accordingly, exchange of playlists exchanges liking information of the users as well as exchanges information only of musical compositions. In other words, since it is possible for a user to provide information of the user itself to the opposite party of exchange or come to know information of the opposite party as in the case of exchange of cards, the exchanging operation of playlists can become communication means between users.

Then, in order to materialize exchange of playlists, a relationship of trust between users is significant. In short, by exchanging playlists, a relationship of trust between users can be confirmed. In other words, by confirming a relationship of trust between users by an exchanging operation of playlists, it is possible to further strengthen the relationship of trust between the users.

Further, since a playlist indicates the liking of its user, by exchanging the playlists, also those music compositions which do not conform to the liking of the user can be shared. In particular, where a certain user collects musical compositions based on the liking of the user itself, the collected musical compositions may be one-sided to a certain genre or the like. Further, since the information collection capability of an individual is limited, even if a musical composition conforms to the liking, it may not always be acquired. Sharing of music data can reduce such one-sidedness or shortage as described above. Furthermore, sharing of music data not only allows mere sharing of data but also can present a new musical composition to a user to enhance the desire of the user for acquisition or purchase.

Further, sharing of music data makes it possible to easily change an apparatus from which sound is to be outputted, diversifies a reproduction operation of music data and enhances the entertaining property together with the convenience. For example, if playlists of music data stored in different portable telephone sets of a plurality of users are supplied to and registered into one audio device, then music data stored in the portable telephone sets can be outputted as sound from the audio device. In particular, it is possible to easily achieve such a situation that a plurality of users meet with their musical compositions and listen to and enjoy the musical compositions as well as it is possible to output sound from an arbitrary apparatus which can share music data.

Now, the portable telephone set 101 which functions as a terminal apparatus of the network system 100 having such a configuration as described above is described. FIG. 2 shows an example of an internal configuration of the portable telephone set 101.

Referring to FIG. 2, the portable telephone set 101 includes a central processing unit (hereinafter referred to as CPU) 201 which is a mathematical operation processing section and executes a software program to execute value processes. The CPU 201 is connected to a read only memory (hereinafter referred to as ROM) 202 and a random access memory (hereinafter referred to as RAM) 203 through a bus 204. The ROM 202 stores software programs and data beforehand. The software programs and data stored in the ROM 202 and a storage section 213 are loaded into the RAM 203. Also data and so forth necessary for the CPU 201 to execute various processes are suitably stored into the RAM 203.

The CPU 201, ROM 202 and RAM 203 are connected to each other by the bus 204. Also an input/output interface 210 is connected to the bus 204.

An inputting section 211 including a keyboard, a mouse and so forth, an outputting section 212 including a display unit such as a CRT (Cathode Ray Tube) display apparatus or an LCD (Liquid Crystal Display) apparatus, a speaker and so forth, and a storage section 213 formed from a hard disk and so forth are connected to the input/output interface 210. Further, a telephone network communication section 214 formed from a modem or the like and configured to carry out sound communication or packet communication with a different apparatus through a public telephone network is connected to the input/output interface 210.

In addition to the telephone network communication section 214, a camera section 215 having a digital camera function of picking up an image of an image pickup object to obtain image data of the image pickup object and a wire communication section 216 for carrying out wire communication with the opposite party connected thereto by a wire cable of predetermined standards such as the USB are connected to the input/output interface 210. Also a Bluetooth communication section 217 having the Bluetooth communication function and an IC card section 218 having the IC card function and the reader/writer function are connected to the input/output interface 210.

The Bluetooth communication section 217 can acquire data read out from the ROM 202, RAM 203 or storage section 213 through the input/output interface 210 and supply the data to the opposite party of the Bluetooth communication. Further, the Bluetooth communication section 217 can supply data acquired from the opposite party of communication to the RAM 203, storage section 213 or the like through the input/output interface 210 so as to be retained.

The IC card section 218 has the reader/writer function as well as the IC card function and can carry out the very short distance radio communication with an IC card or an apparatus having the IC card function as well as with a reader/writer or an apparatus having the reader/writer function. The IC card section 218 has an internal storage section formed from a semiconductor memory or the like and can retain data and supply information to the opposite party of communication by the very short distance radio communication. Further, the IC card section 218 can acquire data read out from the ROM 202, RAM 203 or storage section 213 through the input/output interface 210 and supply the data to the opposite party of communication. Furthermore, the IC card section 218 can supply data acquired from the opposite party of communication to the RAM 203, storage section 213 or the like through the input/output interface 210 so as to be retained.

The telephone network communication section 214, camera section 215, wire communication section 216, Bluetooth communication section 217 and IC card section 218 may be formed as a communication section 231 which transfers playlists, music data, device information, user information and so froth. For the transfer of such data, an arbitrary method, that is, an arbitrary communication method, may be used, and a method different from the method described above may be used. In other words, the IC card section 218 may be configured including an additional component to the components 214 to 218 described above, or some or all of the components 214 to 218 may be omitted if communication is possible by some method.

A drive 219 is connected to the input/output interface 210 as occasion demands, and a removable medium 221 such as a magnetic disk, an optical disk, a magneto-optical disk or a semiconductor memory is suitably loaded into the drive 219 such that a computer program read out from the removable medium 221 is installed into the storage section 213 as occasion demands.

Now, exchange of a playlist and sharing of music data by the portable telephone set 101 having such a configuration as described above are described. First, sharing of music data by two portable telephone sets having similar configurations and similar functions to each other like the portable telephone set 101 and the portable telephone set 102 is described with reference to FIGS. 3A to 3C.

As described hereinabove, exchange of playlists is carried out using the very short distance radio communication by the IC card function and the reader/writer function. In the following description, the portable telephone set on the side which uses the reader/writer function to establish a connection, that is, on the side which issues a request for exchange of playlists, is referred to as portable telephone set A. On the other hand, the portable telephone set on the side which uses the IC card function and to which the portable telephone set A is connected, that is, on the side which responds to the exchanging request of playlists, is hereinafter referred to as portable telephone set B.

Figure 3A:
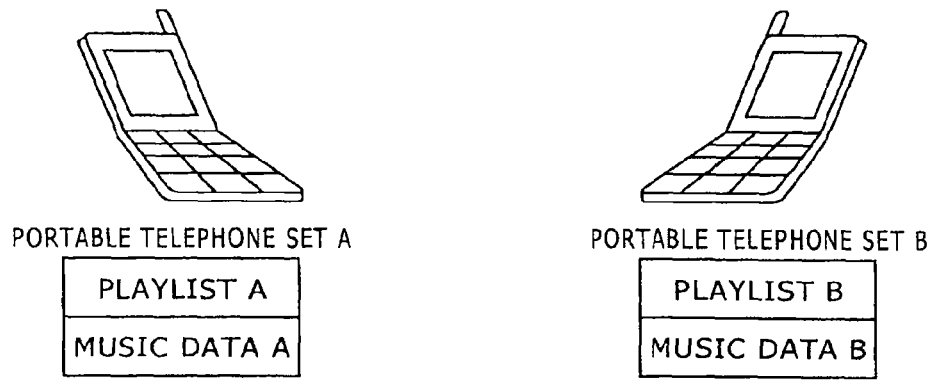
FIGS. 3A, 3B and 3C are schematic views illustrating an example of a manner of exchange of playlists and sharing of music data.

Referring first to FIG. 3A, the portable telephone set A has stored therein in advance a playlist A belonging to the portable telephone set A itself and music data A of musical compositions corresponding to the playlist A. Similarly, the portable telephone set B has stored therein in advance a playlist B belonging to the portable telephone B itself and music data B of musical compositions corresponding to the playlist B.

Figure 3B:
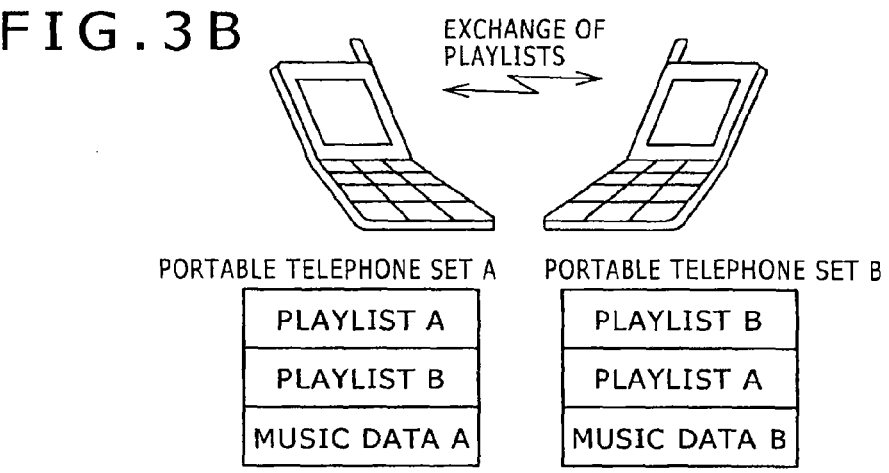

The portable telephone set A on the side which requests for exchange of playlists is set to a polling mode and is moved to approach the portable telephone set B as seen in FIG. 3B. When the portable telephone set A and the portable telephone set B approach each other into a region in which they can communicate with each other to establish a connection, exchange of playlists is carried out. In particular, the portable telephone set A supplies the playlist A to the portable telephone set B and acquires the playlist B from the portable telephone set B and stores and manages the playlist B in an associated relationship with the portable telephone set B. As a result, the portable telephone set A retains the playlist A retained from the beginning therein, the playlist B acquired newly, and the music data A corresponding to the playlist A.

On the contrary, the portable telephone set B supplies the playlist B to the portable telephone set A and acquires the playlist A from the portable telephone set A and then stores and manages the playlist A in an associated relationship with the portable telephone set A. As a result, the portable telephone set B retains the playlist B retained from the beginning therein, the playlist A acquired newly and the music data B corresponding to the playlist B.

In this manner, when a playlist which is information representative of characteristics of an individual user is to be exchanged, in order to avoid unintended exchange, such a communication method that the opposite party of communication can be indicated clearly such that apparatus which are to be communicated with each other are approached sufficiently as in the case of the very short distance radio communication described hereinabove is preferably used.

It is to be noted that usually the antenna of the IC card section 218 utilized for the very short distance radio communication is provided in the inside of a housing of the portable telephone set but is not exposed to the outer face of the housing. Accordingly, since such IC card sections 218 of different apparatus do not contact with each other at all, upon exchange of playlists, the apparatus may be contacted with each other, which is similar to making the apparatus approach each other.

Figure 3C:
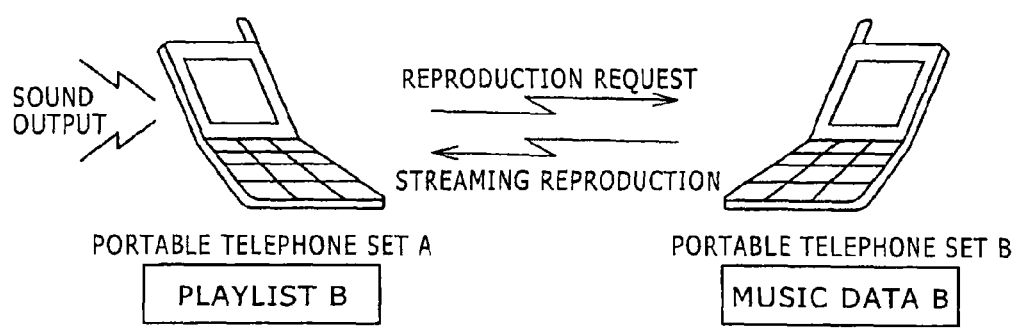

If, in this state, the user selects a musical composition to be reproduced from within the playlist B, then the portable telephone set A utilizes the Bluetooth communication to issue a reproduction request for the selected musical composition or music data to the portable telephone set B as seen in FIG. 3C. The portable telephone set B streaming reproduces the music data B in response to the request and supplies the streaming data to the portable telephone set A using the Bluetooth communication. The portable telephone set A reproduces the streaming data and outputs sound of the streaming data. Naturally, it is possible for the portable telephone set B to issue a request for reproduction of the music data A to the portable telephone set A conversely. In other words, the portable telephone set A and the portable telephone set B can share the music data owned by them, that is, can share the music data A and the music data B, by such exchange of the playlists of them between them.

It is to be noted, however, that, in order to share music data, it is necessary for the portable telephone set A and the portable telephone set B to be positioned within a communication range of the Bluetooth communication.

The portable telephone set A and the portable telephone set B display the playlists as a GUI on the screen thereof. The user of the portable telephone set 101 would operate the GUI to select a musical composition or music data to be reproduced from within the displayed playlists. If a musical composition is selected, then the portable telephone set 101 specifies where the musical composition or music data corresponding to the playlist exists. Then, if the portable telephone set 101 itself has the musical composition or music data therein, then it reproduces the same and outputs sound. On the other hand, if the music data selected by the user exists in the opposite party apparatus, then the portable telephone set 101 issues a request for streaming reproduction of the music data to the opposite party apparatus. At this time, if the opposite party apparatus does not exist within the communication range, then the portable telephone set 101 may not reproduce the musical composition. Therefore, it is preferable for the portable telephone set 101 to detect, before it displays the playlists as a GUI, a different apparatus within the communication range and then set so that the playlist which the apparatus which is not detected has may not be selected by the user.

FIG. 4 shows an example of a configuration of functional blocks provided in the portable telephone set 101 for implementing such exchange of playlists and sharing of music data as described above.

Referring to FIG. 4, the portable telephone set 101 includes a device control section 301 for controlling the entire portable telephone set 101. The device control section 301 is a block implemented by the CPU 201, ROM 202, RAM 203, bus 204 and so forth shown in FIG. 2. The device control section 301 includes a playlist exchange A control section 311, a playlist exchange B control section 312, a display control section 313, a transmission side reproduction processing control section 314, and a reception side reproduction processing control section 315.

The playlist exchange A control section 311 is a control section on the side which issues a request for exchange of playlists, that is, which controls processes relating to playlist exchange of the portable telephone set A in the example of FIGS. 3A to 3C. The playlist exchange B control section 312 is a control section on the side which receives a request for exchange of playlists, that is, which controls processes relating to playlist exchange of the portable telephone set B in the example of FIGS. 3A to 3C. The display control section 313 is a control section which controls display of, for example, playlists and so forth. The transmission side reproduction processing control section 314 is a processing section which controls a transmission side reproduction process of streaming reproducing music data in accordance with a request from a different apparatus. The reception side reproduction processing control section 315 is a control section which controls a reception side reproduction process of receiving and reproducing streaming data transmitted thereto from a different apparatus to output sound.

Further, the portable telephone set 101 has a device memory 302 as a storage area thereof. The device memory 302 is a functional block implemented by the RAM 203 and/or the storage section 213 described hereinabove with reference to FIG. 2. The device memory 302 has a storage area separate from the storage area of the IC card function and having a storage capacity greater than the memory capacity of the IC card section 218. The device memory 302 stores a large amount of data including a playlist, music data and so forth.

Further, the portable telephone set 101 has, as the IC card section 218, an IC card control section 321, an IC card memory 322 and an antenna section 323. The IC card control section 321 carries out control processes for implementing the IC card function. The IC card memory 322 is a storage area for implementing the data retaining function by the IC card function. The antenna section 323 is an antenna for transmitting and receiving a signal in the very short distance radio communication by the IC card function. The antenna section 323 transmits information supplied from the IC card control section 321, and receives information supplied thereto from the outside by the very short distance radio communication and supplies the received information to the IC card control section 321.

Further, the portable telephone set 101 has, as the Bluetooth communication section 217, a Bluetooth control section 331 and an antenna section 332. The Bluetooth control section 331 carries out control processes relating to Bluetooth communication. The antenna section 332 is an antenna for transmitting and receiving a signal in the Bluetooth communication.

The portable telephone set 101 further has a transmission side player 341 and a reception side player 342. The transmission side player 341 streaming reproduces music data and outputs streaming data. The reception side player 342 reproduces streaming data and outputs a sound signal.

The device control section 301 executes various processes in accordance with a user instruction inputted from the inputting section 211. The playlist exchange A control section 311 of the device control section 301 controls the IC card control section 321 to execute the very short distance radio communication so that processes of the portable telephone set A relating to playlist exchange are executed. Meanwhile, the playlist exchange A control section 311 reads out data stored in the device memory 302 and supplies the data to the IC card control section 321 such that the data is transmitted by the very short distance radio communication. Further, the playlist exchange A control section 311 acquires data received by the very short distance radio communication by the IC card control section 321 and stores the data into the device memory 302.

The playlist exchange B control section 312 controls the IC card control section 321 to execute the very short distance radio communication to execute processes as those of the portable telephone set B relating to playlist exchange. Further, the playlist exchange B control section 312 reads out data stored in the device memory 302 and supplies the data to the IC card control section 321 such that the data is transmitted by the very short distance radio communication. Further, the playlist exchange B control section 312 acquires data received by the very short distance radio communication by the IC card control section 321 and stores the data into the device memory 302.

The display control section 313 controls image display by a monitor included in the outputting section 212. For example, the display control section 313 reads out a playlist stored in the device memory 302 and supplies the playlist to the outputting section 212 such that an image of the playlist is displayed as a GUI on the monitor. Further, the display control section 313 controls the inputting section 211 to accept a user instruction inputted in response to the display on the monitor.

The transmission side reproduction processing control section 314 reads out, in accordance with a request for reproduction received through the Bluetooth control section 331, requested music data or musical composition from the device memory 302 and controls the transmission side player 341 to produce streaming data. The transmission side reproduction processing control section 314 supplies the streaming data to the Bluetooth control section 331 so as to be transmitted to the source of the request.

If the user selects a musical composition belonging to a different device from within a playlist of the different device, then the reception side reproduction processing control section 315 controls the Bluetooth control section 331 to transmit a reproduction request. When the Bluetooth communication section 217 receives streaming data transmitted in response to the reproduction request, the reception side reproduction processing control section 315 acquires the streaming data from the Bluetooth control section 331 and controls the reception side player 342 to reproduce the streaming data so that sound is outputted from the speaker of the outputting section 212.

Now, data to be stored in the portable telephone set 101 are described. FIG. 5 illustrates an example of a configuration of data to be stored in the portable telephone set 101.

The portable telephone set 101 stores various data into two storage regions of the IC card memory 322 and the device memory 302. The device control section 301 accesses a common region of the IC card memory 322 through IC card software 351 to carry out reading out or writing of data from or into the common region of the IC card memory 322. Further, the device control section 301 accesses the device memory 302 through a device application program interface (API) 352 to carry out reading out or writing of data from or into the device memory 302. The IC card software 351 and the device API 352 individually function as interfaces of the IC card memory 322 and the device memory 302, respectively. By utilizing such IC card software 351 or device API 352 to access the IC card memory 322 or device memory 302, development of the device control section 301 is facilitated.

The IC card memory 322 can store only a small amount of data therein. In the common region of the IC card memory 322, for example, IC card production information 361, device setting information 362 and log information 363 are stored. The IC card production information 361 is identification information for identification of the IC card control section 321 allocated upon production to the IC card control section 321. Where the portable telephone set 101 has one IC card function (IC card section 218), the IC card production information 361 can be utilized also as information for identification of the portable telephone set 101.

The device setting information 362 is information regarding the portable telephone set 101 as a device in which the IC card section 218 is provided. The device setting information 362 includes apparatus information 371 which relates to the portable telephone set 101 such as a function, a performance and so forth which the portable telephone set 101 has, and user information 372 which is basic information regarding the user of the portable telephone set 101.

The log information 363 is history information of the communication process or the reproduction process. The log information 363 includes, for example, a high touch log 373 which is history information of the very short distance radio communication by the IC card section 218 and an immediately preceding reproduction log 374 which information relating to a preceding reproduction process.

The device memory 302 can store an amount of data greater than that of the IC card memory 322. The device memory 302 stores, for example, user addition information 381, playlist information 382 and a user list 383.

The user addition information 381 is further detailed information regarding the user of the portable telephone set 101. The user addition information 381 includes user information A 391 and user information B 392 classified in level so that the range of disclosure of information can be set stepwise.

The playlist information 382 is information relating to music data as described hereinabove. The playlist information 382 includes a device ID 393 which is information for specifying a device in which music data corresponding to the playlist are stored, and a product number list 394 which is a list of product numbers which are identification information of music data. The product numbers included in the product number list 394 are information by which at least music data can be identified in the device in which the music data are stored.

The user list 383 is a list of user information of users with whom playlists are exchanged. Accordingly, the user list 383 includes information for each user of a user ID 395, an icon number (icon No.) 396, a handle name 397, a greeting sentence 398 and so forth.

Further, the device memory 302 stores, for each product number, that is, for each musical composition, included in the product number list 394 of the playlist information 382, also music information 401 which is information regarding the musical composition. The music information 401 includes a product number 411 for the identification of the musical composition, a title 412 of the musical composition, and a package ID 413 to which the musical composition belongs. The product number 411 is same as the product number included in the product number list 394. In particular, the product numbers of the product number list 394 and the music information 401 are associated with each other by the product number 411. It is to be noted that the product numbers 411 and the product numbers included in the product number list 394 need not necessarily be same as each other only if a corresponding relationship between the product number list 394 and the music information 401 is indicated. The title 412 is information representative of the name of the musical composition, that is, the title of the musical composition. The package ID 413 is information for the identification of a package which is a unit of a work formed from one or a plurality of musical compositions. For example, a plurality of musical compositions are sold or transferred collectively. As a unit in management in this instance, a package which includes a plurality of musical compositions is used.

Further, the device memory 302 stores also package information 421 which is information relating to the package represented by the package ID 413 of the music information 401. The package information 421 includes, for example, a package product number 431, a package name 432, a package kana name 433, and a jacket URL 434. The package product number 431 is same as the package ID 413 and associates the package information 421 and the music information 401 with each other. It is to be noted that the package product number 431 need not necessarily be same as the package ID 413 only if it indicates a corresponding relationship with the package ID 413 to which the package information 421 corresponds.

The package name 432 and the package kana name 433 are information regarding the name allocated to the package for facilitating identification of the package by the user. The jacket URL 434 is information indicative of a data providing source of an image or jacket allocated to the jacket. It is to be noted that the jacket URL 434 may be any information only if it provides a providing source of the data of the jacket and may be information other than a URL.

The data are described in more detail with reference to FIGS. 6 to 10. FIG. 6 illustrates an example of data included in the device setting information 362.

Referring to FIG. 6, the apparatus information 371 is formed from information of 192 bytes in the maximum. The apparatus information 371 may be any information if it relates to a terminal apparatus, that is, relates to the portable telephone set 101, such as identification information or information relating to a function. The user information 372 is information regarding the user of the portable telephone set 101 and includes, for example, an information disclosure level, a disclosure icon, a handle name, a greeting sentence and so forth. The information disclosure level is setting information representative of to which degree information relating to the user or the portable telephone set 101 may be disclosed to a different user or device. For example, the information disclosure level designates whether or not a playlist should be exchanged or designates which information should be disclosed such as the apparatus information 371 or the user information 372. The information disclosure level is set, for example, in accordance with a user information inputted through a GUI or the like.

The disclosure icon is information for setting an image or an icon representative of the user. This icon may be determined selectively from among images prepared in advance, or an image prepared by the user or the like may be used as the icon. An image designated by the disclosure icon is disclosed as an icon representative of the user, that is, is provided to a different device upon playlist exchange. The handle name is a name representative of the user and can be set arbitrarily by the user. The greeting sentence is a message, for example, for the self introduction and can be set arbitrarily by the user itself.

Naturally, the device setting information 362 may include information different from the information described hereinabove.

FIG. 7 illustrates an example of data included in the user addition information 381. Referring to FIG. 7, the user information A 391 of the user addition information 381 is information to be disclosed to a greater number of other users than those users to which user information B 392 may be disclosed from within the user addition information 381 or information which is to be disclosed to an arbitrary other user. The user information A 391 includes the sex, blood type, birthday, constellation and so forth of the user. The user information B 392 is information which may be disclosed only to a particular user or users from within the user addition information 381 or information which should not be disclosed to any other user. The user information B 392 includes information from which the individual user can be specified, that is, information of comparatively high personality, such as the name, kana name, telephone number, mail address, telephone number, URL, RSS (Rich Site Summary) and so forth of the user.

FIG. 8 illustrates an example of data included in the playlist information 382. Referring to FIG. 8, the device ID 393 is formed, for example, from 16 alphanumeric letters obtained by ASCII conversion of 8 bytes of an apparatus ID allocated to the device. The product number list 394 is formed from the product numbers of different musical compositions.

FIG. 9 illustrates an example of data included in the music information 401. Referring to FIG. 9, the music information 401 includes the product number 411, title 412, and package ID 413 described hereinabove. The music information 401 may further include information of, for example, a kana title representing the title of the musical composition in katakana, an artist name representative of the name of a player of the musical composition, an artist kana name representing the artist name in katakana, a genre name representative of a type or genre of the musical composition, musical composition time representative of reproduction time of the musical composition, a sound source purchase destination URL representative of a URL of the purchase destination of the music data, an expanded URL indicative of a URL such as an RSS by which detailed description of the musical component is presented, a reproduction time number representative of the number of times by which the musical composition has been reproduced and so forth. Naturally, the music information 401 may further include any other information.

FIG. 10 illustrates an example of data included in the package information 421. Referring to FIG. 10, the package information 421 may include information of the sales starting day of the package in addition to the package ID 431, package name 432, package kana name 433 and jacket URL 434. Naturally, the package information 421 may further include any other information.

Figure 11:
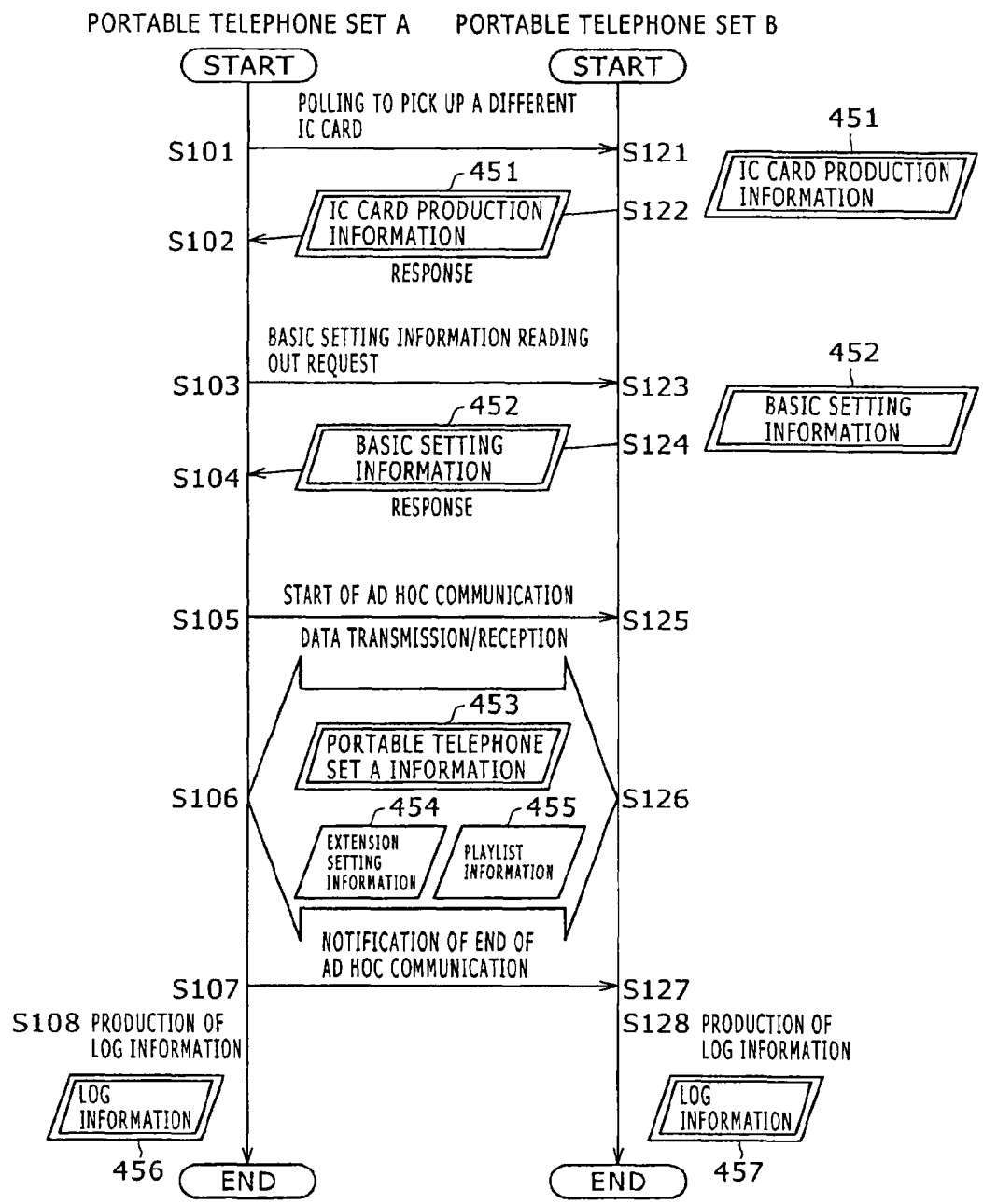
FIG. 11 is a flow chart illustrating an outline of playlist exchange.

Now, a flow of processes relating to sharing of playlists and sales of music data by the portable telephone set 101 having such a configuration as described above is described. First, an outline of exchange of playlists is described with reference to a flow chart of FIG. 11. FIG. 11 illustrates an outline of exchange of playlists carried out by the portable telephone set A and the portable telephone set B as in the example described hereinabove with reference to FIGS. 3A to 3C.

Figure 12:
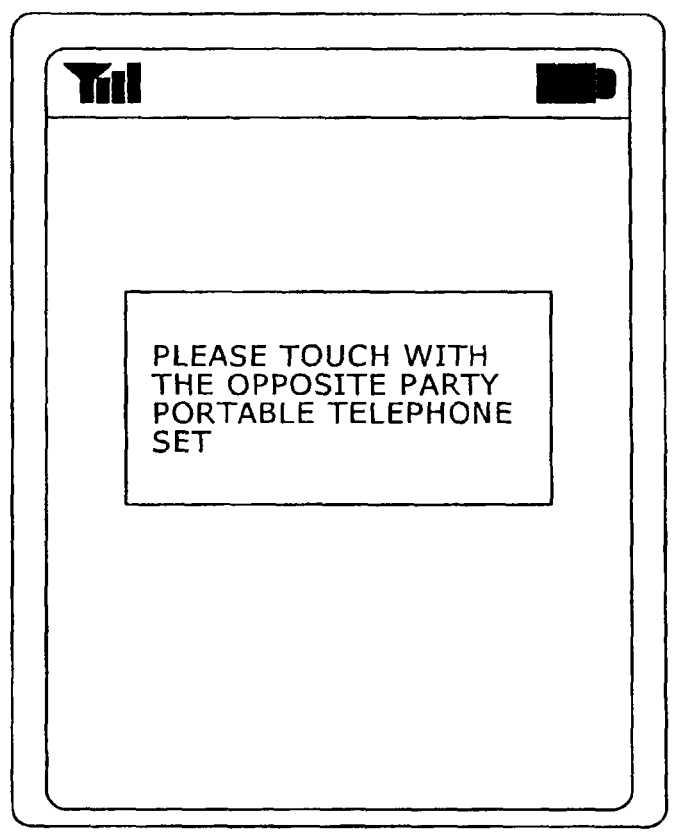
FIGS. 12, 13, 14 and 15 are schematic views illustrating different examples of a display screen.

If the user carries out an operation for instruction to carry out exchange of playlists, then the portable telephone set A places, at step S101, the operation mode of the IC card section 218 into a polling mode so that a polling signal is outputted by the very short distance radio communication carried out by the IC card section 218 to pick up a different IC card which exists within a communication range. Simultaneously, the portable telephone set A causes the monitor thereof to display a message for urging the user to move the portable telephone set A itself toward the portable telephone set B, which will become the opposite party of exchange of playlist, such as "Please touch with the opposite party portable telephone set" as seen in FIG. 12.

If the portable telephone set A approaches the portable telephone set B sufficiently and the portable telephone set B receives the polling signal at step S121, then the portable telephone set B transmits, at step S122, IC card production information 451 for the identification of the IC card section 218 of the portable telephone set B, or the portable telephone set B itself which has the IC card function, to the portable telephone set A by the very short distance radio communication carried out by the IC card section 218 in response to the polling signal.

The IC card production information 451 is stored in the IC card memory 322. In short, the IC card production information 451 is equivalent to the IC card production information 361 illustrated in FIG. 5.

The portable telephone set A receives the response from the portable telephone set B, that is, the IC card production information 451 of the portable telephone set B at step S102. After the IC card production information 451 is received, the portable telephone set A transmits, at step S103, a basic setting information reading out request to the portable telephone set B of the source of the IC card production information 451 by the very short distance radio communication carried out by the IC card section 218. The portable telephone set B receives the request at step S123 and transmits basic setting information 452 of the portable telephone set B to the portable telephone set A by the very short distance radio communication carried out by the IC card section 218 in response to the request at step S124.

The basic setting information 452 is basic setting information stored in the IC card memory 322 and necessary for communication by a connection system called ad hoc connection of the very short distance radio communication (such communication is hereinafter referred to as ad hoc communication) and exchange of playlists. In short, the basic setting information 452 is equivalent to the device setting information 362 illustrated in FIG. 5 and includes the apparatus information 371, user information 372 and so forth as seen in FIG. 6.

The portable telephone set A receives the response from the portable telephone set B, that is, the basic setting information 452 of the portable telephone set B at step S104. After the basic setting information 452 is received, the portable telephone set A issues a request to start ad hoc communication to the portable telephone set B at step S105. When the portable telephone set B receives the request and acknowledges the connection at step S125, ad hoc communication is established and transfer of data is started. The portable telephone set A and the portable telephone set B carry out transmission and reception of data to and from the other parties at steps S106 and S126, respectively.

For example, the portable telephone set A transmits portable telephone set A information 453 including the IC card production information 451 and the basic setting information 452 of the portable telephone set A to the portable telephone set B. Further, the portable telephone set A and the portable telephone set B exchange, for example, extension setting information 454 and playlist information 455 thereof with each other. The extension setting information 454 is setting information stored in the device memory 302 and extended as occasion demands. In short, the extension setting information 454 is equivalent to the user addition information 381 illustrated in FIG. 5. Meanwhile, the playlist information 455 is information stored in the device memory 302 for designating a musical composition. In short, the playlist information 455 is equivalent to the playlist information 382 illustrated in FIG. 5.

Figure 13:
Figure 14:
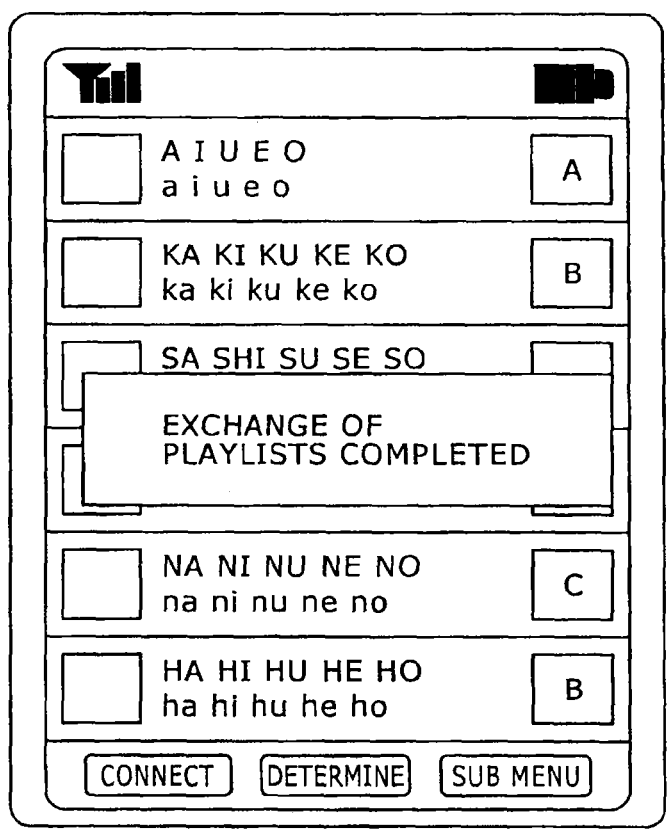

While the ad hoc communication is being carried out, such a message "Playlists being exchanged" representing that the communication is proceeding as seen in FIG. 13 is displayed on the monitor of the portable telephone set A. Then, when the exchange of playlists is completed, such a message "Exchange of playlists completed" representing that the exchange of playlists is completed as seen in FIG. 14 is displayed on the monitor of the portable telephone set A.

After the exchange of playlists is completed as described above, the portable telephone set A issues a notification of the completion of ad hoc information to the portable telephone set B at step S107. The portable telephone set B receives the notification at step S127. The ad hoc communication is ended therewith.

Figure 15:
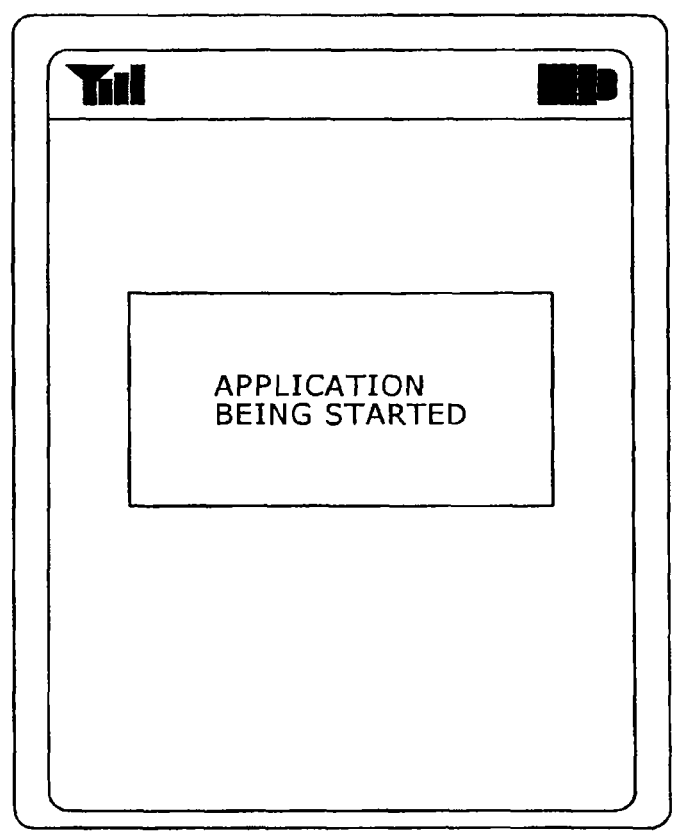

It is to be noted that, when the portable telephone set B receives the request to start ad hoc communication at step S125, an application for implementing the functions of the device control section 301 for exchanging playlists and reproducing music data based on a playlist is started. While the application is operating, such a message "Application being started" as seen in FIG. 15 is displayed on the monitor of the portable telephone set B. Further, when the application is started, the ad hoc communication is started to start transmission and reception of data (step S126). At this time, such a message as seen in FIG. 13 is displayed on the monitor of the portable telephone set B similarly as in the case of the portable telephone set A. Further, when the exchange of playlists is completed, such a message as seen in FIG. 14 is displayed on the monitor of the portable telephone set B similarly as in the case of the portable telephone set A.

After the ad hoc communication is completed, the portable telephone set A produces log information 456 of the ad hoc communication and stores the log information 456 into the IC card memory 322 at step S108. In short, the log information 456 is equivalent to the high touch log 373 illustrated in FIG. 5. Similarly, the portable telephone set B produces log information 457 of the ad hoc communication and stores the log information 457 into the IC card memory 322 at step S128. In short, the log information 457 is equivalent to the high touch log 373 illustrated in FIG. 5.

Figure 16:
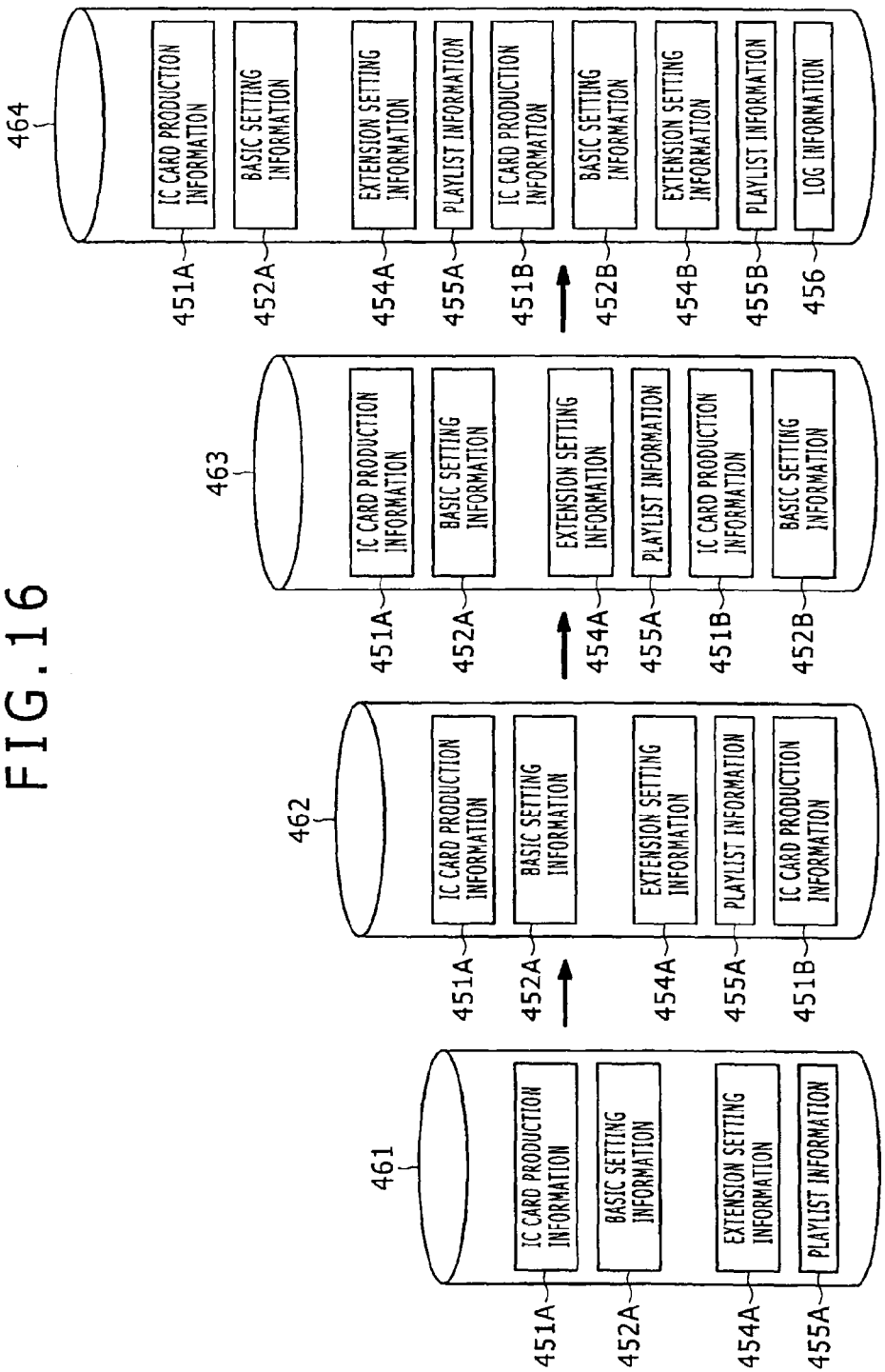

FIG. 16 illustrates an example of a manner of transition of information stored in the portable telephone set A during such exchange of playlists as described above.

In an initial state before the process at step S101 of FIG. 11 is started, the storage region of the portable telephone set A which includes both of the IC card memory 322 and the device memory 302 has storage region 461, which is illustrated at a leftmost portion of FIG. 16, stored therein. The storage region 461 includes IC card production information 451A which is the IC card production information 451 of the portable telephone set A, basic setting information 452A which is the basic setting information 452 of the portable telephone set A, extension setting information 454A which is extension setting information of the portable telephone set A, and playlist information 455A which is the playlist information 455 of music data or musical compositions stored in the portable telephone set A.

When the portable telephone set A receives the IC card production information 451 from the portable telephone set B at step S102, IC card production information 451B which is the IC card production information 451 of the portable telephone set B is additionally stored into the storage region of the portable telephone set A as seen from a storage region 462 illustrated at a second leftmost portion in FIG. 16.

When the portable telephone set A receives the basic setting information 452 from the portable telephone set B at step S104, basic setting information 452B which is the basic setting information 452 of the portable telephone set B is additionally stored into the storage region of the portable telephone set A as seen from a storage region 463 illustrated at a third leftmost portion in FIG. 16.

When the extension setting information 454 and the playlist information 455 are exchanged and then the log information 456 is produced at step S108, extension setting information 454B which is the extension setting information 454 of the portable telephone set B, playlist information 455B which is the playlist information 455 of the music data stored in the portable telephone set B and the log information 456 produced at step S108 are additionally stored into the storage region of the portable telephone set A as seen from a storage region 464 illustrated at the rightmost portion of FIG. 16.

FIG. 17 is a view corresponding to FIG. 16 and illustrates an example of a manner of transition of information stored in the portable telephone set B in the exchange of playlists.

In an initial stage before the process at step S101 of FIG. 11 is started, the IC card production information 451B, basic setting information 452B, extension setting information 454B and playlist information 455B are stored in the storage region of the portable telephone set B including both of the IC card memory 322 and the device memory 302 as in the case of a storage region 471 illustrated at a left portion of FIG. 17.

When the processes at steps S121 to S128 are executed and information of the playlists and so forth is transferred and then the log information 457 is produced, the IC card production information 451A, basic setting information 452A, extension setting information 454A, playlist information 455A and log information 457 are additionally stored in the storage region of the portable telephone set B as in the case of a storage region 472 illustrated at a right portion of FIG. 17.

Now, a more detailed flow of the playlist exchanging process described hereinabove with reference to FIG. 11 is described with reference to FIGS. 18 to 21.

Figure 18:
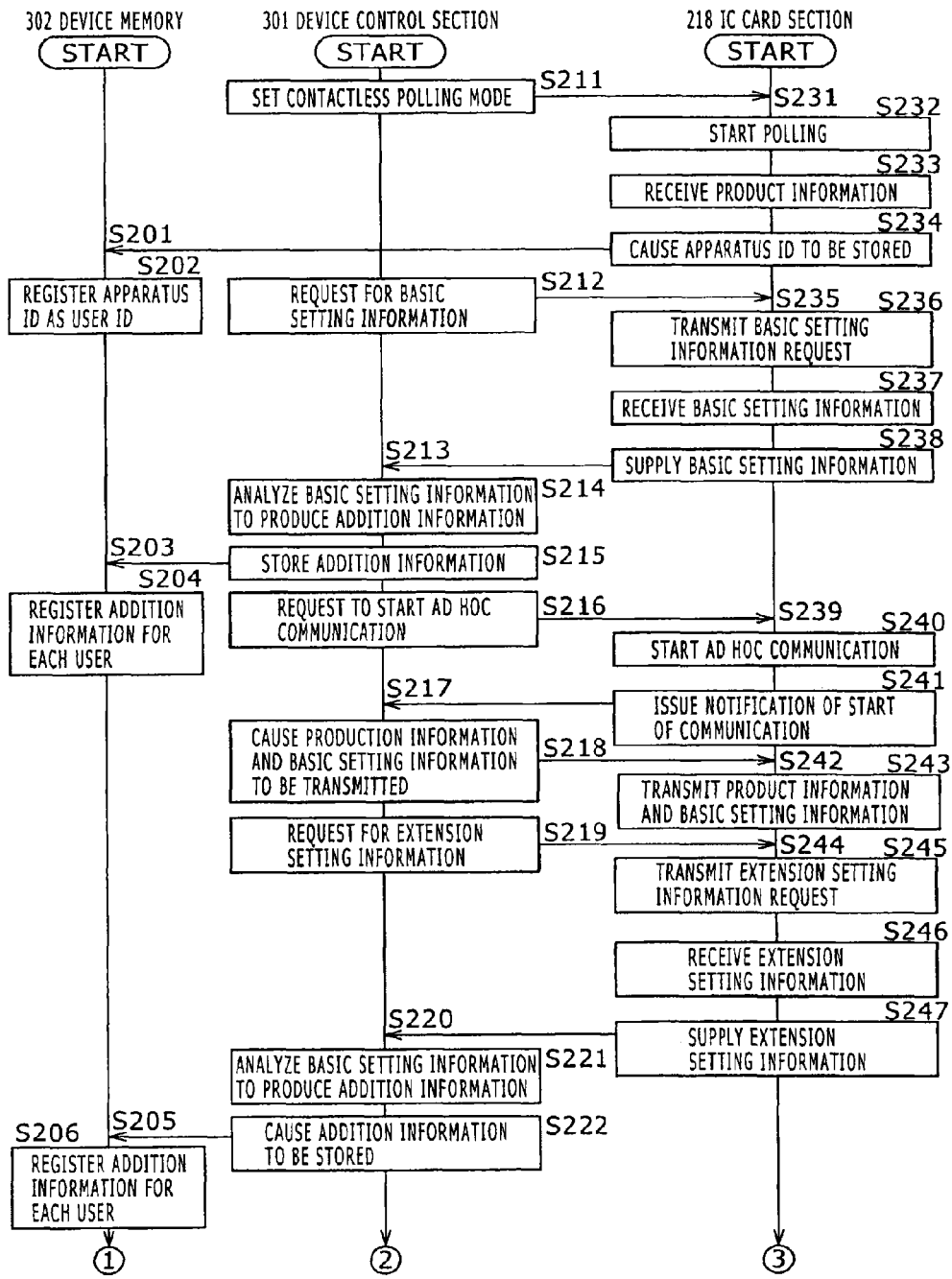
FIGS. 18 and 19 are flow charts illustrating an example of a detailed flow of a playlist exchanging process.
Figure 19:
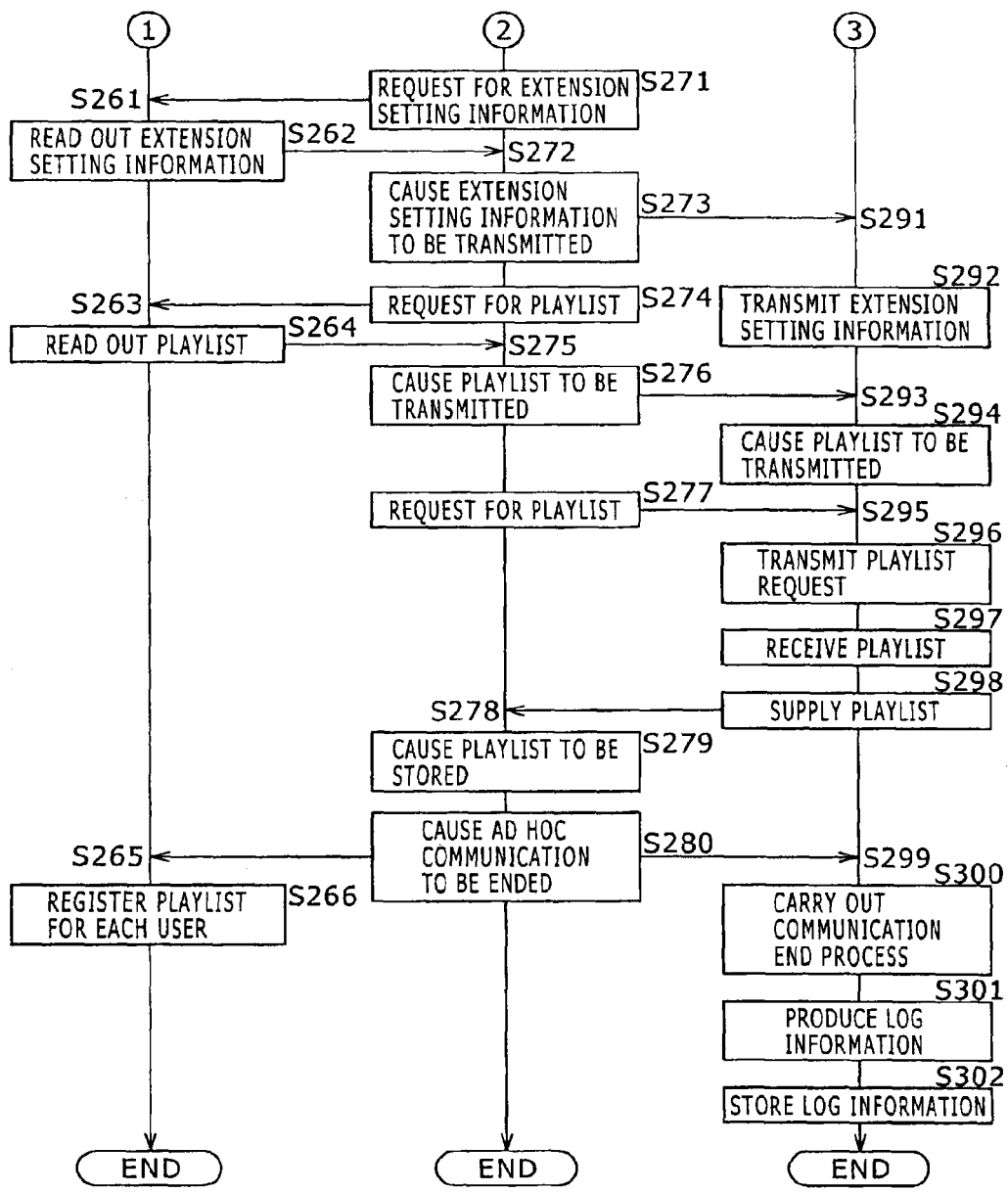

FIGS. 18 and 19 illustrate an example of a flow of processes of the components of the portable telephone set A including the device control section 301, device memory 302 and IC card section 218.

Referring first to FIG. 18, if an instruction to exchange of playlists is issued by the user, then the playlist exchange A control section 311 of the device control section 301 controls the IC card control section 321 to set the IC card section 218 to a contactless polling mode at step S211. The IC card control section 321 of the IC card section 218 acquires the instruction from the device control section 301 at step S231 and controls the antenna section 323 to output a polling signal to start polling at step S232.

After the portable telephone set A approaches the portable telephone set B sufficiently, the portable telephone set B transmits production information as a response to the polling signal. The IC card control section 321 of the IC card section 218 controls the antenna section 323 to receive the production information at step S233 and supplies an apparatus ID for the identification of the portable telephone set B included in the received production information to the device memory 302 so as to be stored at step S234.

The device memory 302 acquires the apparatus ID at step S201 and registers the acquired apparatus ID as the user ID of the user of the portable telephone set B at step S202.

The playlist exchange A control section 311 of the device control section 301 controls the IC card control section 321 to issue a request for the basic setting information 452B of the portable telephone set B at step S212. The IC card control section 321 of the IC card section 218 acquires the request at step S235 and transmits a basic setting information request for requesting for the basic setting information 452B through the antenna section 323 at step S236. The portable telephone set B transmits the basic setting information 452B in response to the request. The IC card control section 321 of the IC card section 218 receives the basic setting information 452B transmitted from the portable telephone set B through the antenna section 323 at step S237 and supplies the received basic setting information 452B to the playlist exchange A control section 311 of the device control section 301 at step S238.

The playlist exchange A control section 311 of the device control section 301 acquires the basic setting information 452B at step S213 and analyzes the acquired basic setting information 452B to extract necessary information from the basic setting information 452B and produce addition information to be added to the user ID at step S214. The playlist exchange A control section 311 supplies the produced addition information to the device memory 302 so as to be stored at step S215. The device memory 302 acquires the addition information at step S203, and stores, at step S204, the addition information in an associated relationship with the user ID registered at step S202 to register the addition information for the individual user.

After the addition information is stored, the playlist exchange A control section 311 of the device control section 301 controls the IC card control section 321 to issue a request to start ad hoc communication with the portable telephone set B at step S216. The IC card control section 321 of the IC card section 218 acquires the request at step S239 and carries out a communication connection process of issuing a request for connection for ad hoc communication to the portable telephone set B and receiving a response from the portable telephone set B through the antenna section 323 to start ad hoc communication with the portable telephone set B at step S240. After the communication is started, the IC card control section 321 of the IC card section 218 issues a notification of the starting of communication to the playlist exchange A control section 311 at step S241.

The playlist exchange A control section 311 of the device control section 301 acquires the notification at step S217 and controls the IC card control section 321 to transmit the IC card production information 451A and the basic setting information 452A of the portable telephone set A at step S218. The IC card control section 321 of the IC card section 218 acquires the request at step S242 and reads out the IC card production information 451A and the basic setting information 452A from the IC card memory 322 and transmits them to the portable telephone set B through the antenna section 323 at step S243.

Further, the playlist exchange A control section 311 of the device control section 301 controls the IC card control section 321 to issue a request for the extension setting information 454B of the portable telephone set B at step S219. The IC card control section 321 of the IC card section 218 acquires the request at step S244 and transmits an extension setting information request for requesting for the extension setting information 454B to the portable telephone set B through the antenna section 323 at step S245. The portable telephone set B transmits the extension setting information 454B in response to the request. The IC card control section 321 of the IC card section 218 receives the extension setting information 454B at step S246 and supplies the received extension setting information 454B to the playlist exchange A control section 311 at step S247.

The playlist exchange A control section 311 of the device control section 301 acquires the extension setting information 454B at step S220 and analyzes the acquired extension setting information 454B to extract necessary information and produce addition information to be added to the user ID at step S221. The playlist exchange A control section 311 supplies the produced addition information to the device memory 302 so as to be stored at step S222. The device memory 302 acquires the addition information at step S205 and stores the addition information in an associated relationship with the user ID registered at step S202 to register the addition information for the individual user at step S206.

Further, the playlist exchange A control section 311 of the device control section 301 issues a request for the extension setting information 454A of the portable telephone set A stored in the device memory 302 at step S271 of FIG. 19. Referring now to FIG. 19, the device memory 302 acquires the request at step S261 and reads out the extension setting information 454A from the storage region and then supplies the extension setting information 454A to the playlist exchange A control section 311 at step S262. The playlist exchange A control section 311 of the device control section 301 acquires the extension setting information 454A at step S272 and supplies the acquired extension setting information 454A to the IC card control section 321 so as to be transmitted to the portable telephone set B at step S273. The IC card control section 321 of the IC card section 218 acquires the extension setting information 454A at step S291 and transmits the acquired extension setting information 454A to the portable telephone set B through the antenna section 323 at step S292.

Further, the playlist exchange A control section 311 of the device control section 301 issues a request for the playlist information 455A corresponding to music data stored in the device memory 302 to the device memory 302 at step S274. The device memory 302 acquires the request at step S363 and reads out the playlist information 455A from the storage region and supplies the playlist information 455A to the playlist exchange A control section 311 at step S264. The playlist exchange A control section 311 of the device control section 301 acquires the playlist information 455A at step S275 and supplies the acquired playlist information 455A to the IC card control section 321 so as to be transmitted to the portable telephone set B at step S276. The IC card control section 321 of the IC card section 218 acquires the playlist information 455A at step S293 and transmits the acquired playlist information 455A to the portable telephone set B through the antenna section 323 at step S294.

Further, the playlist exchange A control section 311 of the device control section 301 controls the IC card control section 321 to issue a request for the playlist information 455B of the portable telephone set B at step S277. The IC card control section 321 of the IC card section 218 acquires the request at step S295 and transmits a playlist request for requesting for the playlist information 455B to the portable telephone set B through the antenna section 323 at step S296. The portable telephone set B transmits the playlist information 455B to the portable telephone set A in response to the request. The IC card control section 321 of the IC card section 218 receives the playlist information 455B at step S297 and supplies the received playlist information 455B to the playlist exchange A control section 311 at step S298.

The playlist exchange A control section 311 of the device control section 301 acquires the playlist information 455B at step S278 and supplies the acquired playlist information 455B to the device memory 302 so as to be stored at step S279. The device memory 302 acquires the playlist information 455B at step S265 and stores the playlist information 455B in an associated relationship with the user ID registered at step S202 to register the playlist information 455 for the individual user at step S266.

After the exchange of playlists is completed in such a manner as described above, the playlist exchange A control section 311 of the device control section 301 controls the IC card control section 321 to end the ad hoc communication at step S280. The IC card control section 321 of the IC card section 218 acquires the request at step S299 and carries out a communicating ending process of issuing a request to end the ad hoc information to the portable telephone set B through the antenna section 323 and receiving a response from the portable telephone set B at step S300. After the communication is ended, the IC card control section 321 of the IC card section 218 produces log information 456 of ad hoc communication at step S301 and stores the log information 456 into the IC card memory 322 at step S302.

Figure 20:
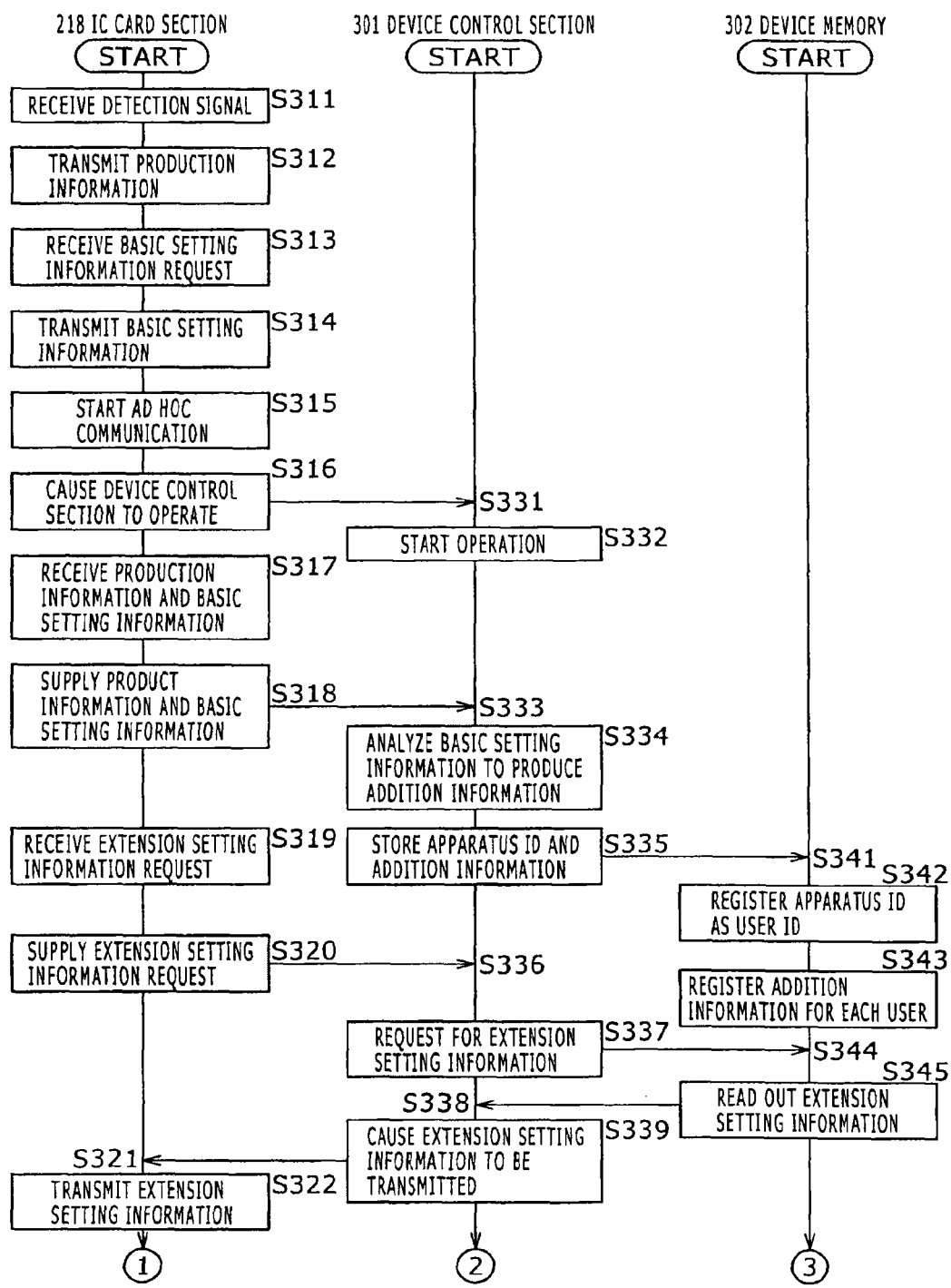
FIGS. 20 and 21 are flow charts illustrating another example of a detailed flow of the playlist exchanging process.

FIGS. 20 and 21 illustrate an example of processes of the components of the device control section 301, device memory 302 and IC card section 218. The flowcharts of FIGS. 20 and 21 correspond to those of FIGS. 18 and 19.

Referring first to FIG. 20, when the portable telephone set A in the polling mode approaches the IC card section 218 by the process at step S232 of FIG. 18, the IC card control section 321 of the IC card section 218 receives a detection signal or polling signal transmitted from the approaching portable telephone set A through the antenna section 323 at step S311. The IC card control section 321 of the IC card section 218 reads out the IC card production information 451B stored in the IC card memory 322 and transmits the IC card production information 451B as a response to the received detection signal to the portable telephone set A through the antenna section 323 at step S312. The IC card production information 451B is received by the portable telephone set A by the process at step S233 of FIG. 18.

When a basic setting information request is transmitted from the portable telephone set A by the process at step S236 of FIG. 18, the IC card control section 321 of the IC card section 218 receives the basic setting information request at step S313 of FIG. 20. The IC card control section 321 of the IC card section 218 reads out the basic setting information 452B stored in the IC card memory 322 and transmits the basic setting information 452B as a response to the received request to the portable telephone set A through the antenna section 323 at step S314. The basic setting information 452B is received by the portable telephone set A by the process at step S237 of FIG. 18.

If a request to start ad hoc communication is issued from the portable telephone set A by the process at step S240 of FIG. 18, then the IC card control section 321 of the IC card section 218 starts ad hoc communication in response to the request at step S315 of FIG. 20. Then, the IC card control section 321 of the IC card section 218 starts up an application for implementing the playlist exchange B control section 312 of the device control section 301 at step S316. The device control section 301 receives the starting request at step S331 and starts up the requested application to implement the playlist exchange B control section 312 at step S332.

When the IC card production information 451A and the basic setting information 452A are transmitted from the portable telephone set A by the process at step S243 of FIG. 18, the IC card control section 321 of the IC card section 218 receives them through the antenna section 323 at step S317 of FIG. 20. The IC card control section 321 of the IC card section 218 supplies the received IC card production information 451A and basic setting information 452A to the playlist exchange B control section 312 at step S318. The playlist exchange B control section 312 of the device control section 301 acquires the IC card production information 451A and the basic setting information 452A at step S333 and analyzes the basic setting information 452A to extract necessary information and produce addition information to be added to the apparatus ID extracted from the IC card production information 451A at step S334. Then, the playlist exchange B control section 312 of the device control section 301 supplies the apparatus ID extracted from the IC card production information 451A and the produced addition information to the device memory 302 so as to be stored at step S335. The device memory 302 acquires the apparatus ID and the addition information at step S341 and registers the apparatus ID as a user ID of the user of the portable telephone set A at step S342. Further at step S343, the device memory 302 stores the addition information in an associated relationship with the user ID registered at step S342 to register the addition information for the individual user.

If an extension setting information request is transmitted from the portable telephone set A by the process at step S245 of FIG. 18, then the IC card control section 321 of the IC card section 218 receives the extension setting information request through the antenna section 323 at step S319 of FIG. 20 and supplies the received extension setting information request to the playlist exchange B control section 312 at step S320.

The playlist exchange B control section 312 of the device control section 301 receives the request at step S336 and issues a request for the extension setting information 454B stored in the device memory 302 at step S337. The device memory 302 acquires the request at step S344 and reads out the extension setting information 454B from the storage region and supplies the extension setting information 454B to the playlist exchange B control section 312 at step S345. The playlist exchange B control section 312 of the device control section 301 acquires the extension setting information 454B at step S338 and supplies the extension setting information 454B to the IC card control section 321 so as to be transmitted to the portable telephone set A at step S339. The IC card control section 321 of the IC card section 218 acquires the extension setting information 454B at step S321 and transmits the extension setting information 454B to the portable telephone set A through the antenna section 323 at step S322. The extension setting information 454B is received by the portable telephone set A by the process at step S246 of FIG. 18.

When the extension setting information 454A is transmitted from the portable telephone set A by the process at step S292 of FIG. 19, the IC card control section 321 of the IC card section 218 receives the extension setting information 454A through the antenna section 323 at step S351 of FIG. 21 and supplies the received extension setting information 454A to the playlist exchange B control section 312 at step S352.

Referring to FIG. 21, the playlist exchange B control section 312 of the device control section 301 receives the extension setting information 454A at step S371 and analyzes the extension setting information 454A to extract necessary information and produce addition information to be added to the user ID at step S372. The playlist exchange B control section 312 supplies the produced addition information to the device memory 302 so as to be stored at step S373. The device memory 302 acquires the addition information at step S381 and stores the addition information in an associated relationship with the user ID registered at step S342 to register the addition information for the individual user at step S342.

When the playlist information 455A is transmitted from the portable telephone set A by the process at step S294 of FIG. 19, the IC card control section 321 of the IC card section 218 receives the playlist information 455A through the antenna section 323 at step S353 of FIG. 21. The IC card control section 321 of the IC card section 218 supplies the received playlist information 455A to the playlist exchange B control section 312 at step S354.

The playlist exchange B control section 312 of the device control section 301 acquires the playlist information 455A at step S374 and supplies the acquired playlist information 455A to the device memory 302 so as to be stored at step S375. The device memory 302 acquires the playlist information 455A at step S383 and stores the playlist information 455A in an associated relationship with the user ID registered at step S342 to register the playlist information 455A for the individual user at step S384.

When a playlist request is transmitted from the portable telephone set A by the process at step S296 of FIG. 19, the IC card control section 321 of the IC card section 218 receives the playlist request through the antenna section 323 at step S355 of FIG. 21. The IC card control section 321 of the IC card section 218 supplies the received playlist request to the playlist exchange B control section 312 at step S356.

The playlist exchange B control section 312 of the device control section 301 acquires the playlist request at step S376 and issues a request for playlist information to the device memory 302 at step S377. The device memory 302 acquires the request at step S385 and reads out the playlist information 455B from the storage region and supplies the playlist information 455B to the playlist exchange B control section 312 at step S386. The playlist exchange B control section 312 acquires the playlist information 455B at step S378 and supplies the acquired playlist information 455B to the IC card control section 321 so as to be transmitted to the portable telephone set A at step S379. The IC card control section 321 of the IC card section 218 acquires the playlist information 455B at step S357 and transmits the playlist information 455B to the portable telephone set A through the antenna section 323 at step S358. The playlist information 455B is received by the portable telephone set A by the process at step S297 of FIG. 19.

After the exchange of playlists is completed in such a manner as described above, the IC card control section 321 of the IC card section 218 carries out a communicating ending process corresponding to the process at step S300 of FIG. 19 to end the ad hoc communication. After the communication is ended, the IC card control section 321 of the IC card section 218 produces log information 457 of the ad hoc communication at step S360 and stores the log information 457 into the IC card memory 322 at step S361.

As described above, the portable telephone set 101 can exchange playlists readily with the portable telephone set 102 which is a different portable telephone set having similar functions to those of the portable telephone set 101.

Figure 22:
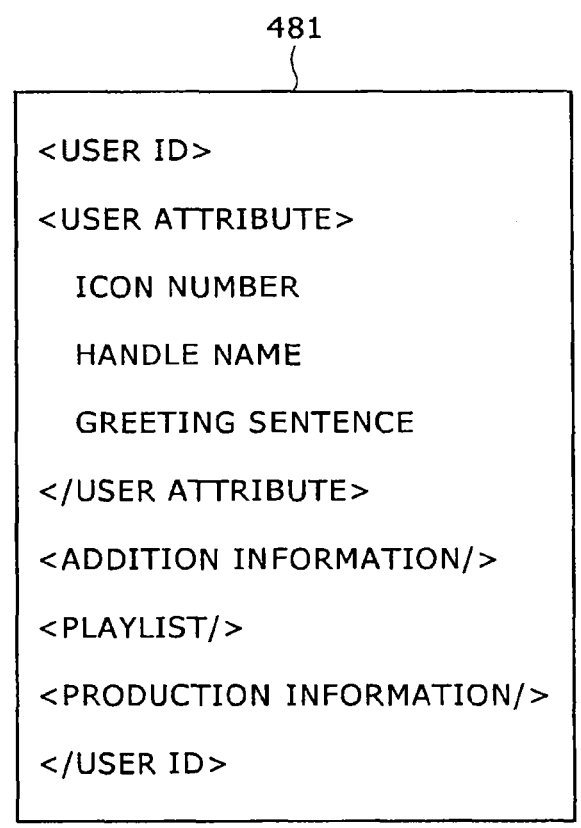
FIG. 22 is a view illustrating an example of a configuration of management information.

FIG. 22 illustrates an example of information registered in the device memory 302.

Information acquired from the opposite party of exchange of playlists is described in such an XML format as illustrated in FIG. 22 in registration information 481. The registration information 481 is used for management of information regarding a playlist and a user for each user. Referring to FIG. 22, the registration information 481 includes a user ID described as a tag. Further, a user attribute formed from information regarding the user of the user ID, addition information of arbitrary substance, a playlist acquired from the user and information relating to the apparatus used by the user such as product information are described in the registration information 481 in such a manner as to belong to the tag of the user ID.

As described hereinabove, since the playlist information includes information of a device in which music data corresponding to a musical composition is stored, the device control section 301 can carry out it readily to specify, for example, when a musical composition is designated, the place of the music data. However, if only this information is utilized, there is the possibility that, for example, when display control of a playlist or the like is to be carried out as hereinafter described, where it is tried to specify to which user or apparatus each playlist belongs, the processing may be complicated because it is necessary to confirm data of all musical compositions.

Where the device memory 302 manages playlist information for each user as seen from FIG. 22, the device control section 301 can easily grasp to which user a certain playlist belongs.

As described above, portable telephone sets having exchange playlists thereof can share music data by streaming reproduction. Now, an outline of such sharing of music data is described with reference to FIG. 23. FIG. 23 illustrates an outline of sharing of music data carried out between the portable telephone set A and the portable telephone set B as in the example of FIGS. 3A to 3C. It is to be noted that here a music composition whose music data is stored in the portable telephone set B is streaming reproduced and sound is outputted from the portable telephone set A is described.

The portable telephone set A, for example, instructed by the user so as to display a playlist carries out a display control process of the playlist to display the playlist on the monitor at step S401. Details of the playlist display control process are hereinafter described. After the playlist is displayed as a GUI on the monitor, the user would operate the GUI of the playlist to carry out selection of a music composition to be reproduced. The portable telephone set A accepts the selection of the music composition by the user at step S402. Naturally, such selection of a music composition to be reproduced may be carried out by some other than the user, for example, by some software program or an external apparatus.

After a musical composition is selected, the portable telephone set A establishes a session with the portable telephone set B, which has music data of the selected musical composition stored therein, for Bluetooth communication at step S403. The portable telephone set B carries out, at step S411, a process relating to session establishment corresponding to the process of the portable telephone set A.

After a session is established, the portable telephone set A transmits a reproduction request for the selected musical composition to the portable telephone set B by the Bluetooth communication at step S404. The portable telephone set B receives the reproduction request at step S412 and activates the transmission side player 341 at step S413. On the other hand, the portable telephone set A having emitted the reproduction request activates the reception side player 342 at step S405.

After the transmission side player 341 is activated, the portable telephone set B starts a reproduction transmission process for streaming reproducing the requested musical composition at step S414. It is to be noted that, at this time, the portable telephone set B may start the reproduction transmission process after it confirms that the reception side player 342 is started in the portable telephone set A. For example, the portable telephone set A may transmit, after the reception side player 342 is activated, a predetermined activation confirmation signal that the reception side player 342 is started to the portable telephone set B such that the portable telephone set B starts the reproduction transmission process at step S414 after it receives the activation starting signal.

After the reproduction transmission process is started, the portable telephone set B transmits streaming data of the musical composition, whose reproduction has been requested, to the portable telephone set A by Bluetooth communication at step S415. The portable telephone set A receives the streaming data at step S406 and then starts a reception outputting process of reproducing the streaming data to output sound at step S407.

The portable telephone set A and the portable telephone set B share music data in such a manner as described above. Then, when the streaming reproduction of the musical composition whose reproduction has been requested comes to an end, the portable telephone set A and the portable telephone set B end the reproduction process.

It is to be noted that, also where a musical composition whose music data is stored in the portable telephone set A is to be outputted as sound from the portable telephone set B, the processes to be executed by the two apparatus are same as those in the case described above except that the processes by the portable telephone set A and the processes by the portable telephone set B are replaced by each other. By exchanging playlists in such a manner as described above, the portable telephone set A and the portable telephone set B can share music data readily.

Now, an example of a detailed flow of the playlist display control process executed at step S401 of FIG. 23 is described with reference to FIG. 24.

If an instruction to display the playlist is issued, then the display control section 313 of the device control section 301 reads out all playlist information stored in the device memory 302 at step S431. In the example of FIG. 16, the display control section 313 reads out the playlist information 455A and the playlist information 455B.

The display control section 313 having read out the playlists produces a GUI image of the playlists and supplies the GUI image to the outputting section 212 so as to be displayed on the monitor at step S432. Then at step S433, the display control section 313 controls the inputting section 211 to start musical composition selection acceptance of accepting selection of a musical composition inputted by the user based on the GUI screen displayed on the monitor.

Figure 25:
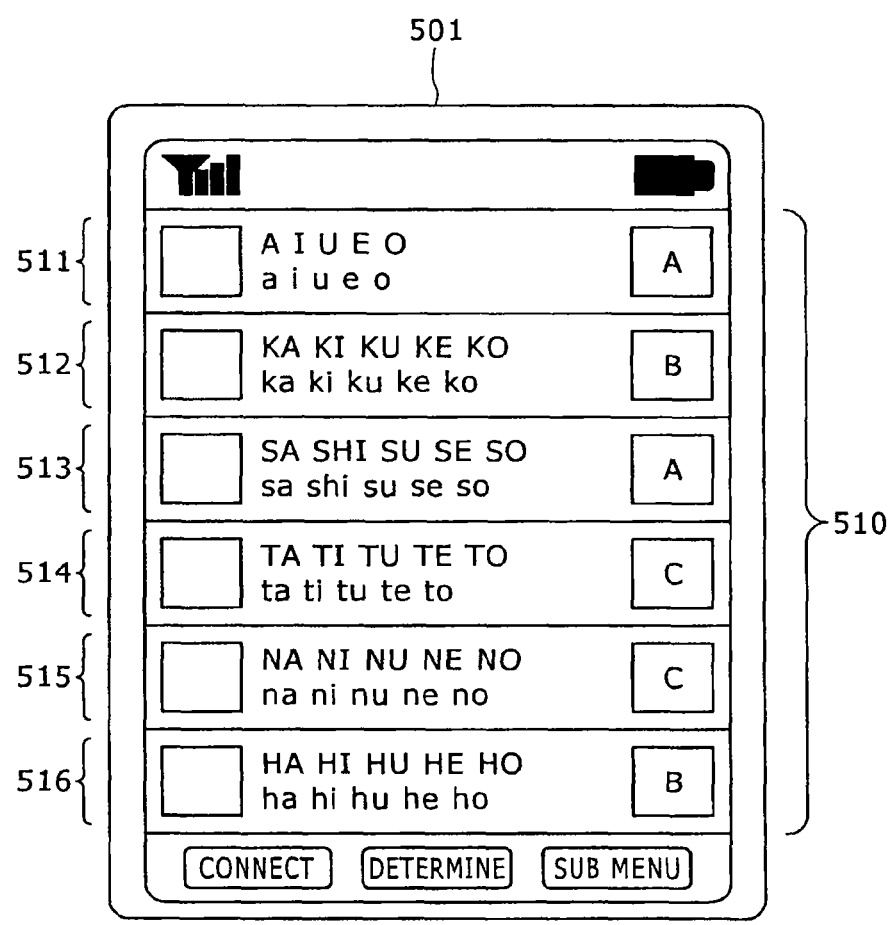
FIG. 25 is a schematic view showing an example of a display screen.

FIG. 25 shows an example of display of a playlist. Referring to FIG. 25, a playlist display region 510 is provided at part or in the entirety of a display region 501 of the monitor, and playlists are displayed in the playlist display region 510.

Information is displayed as a list for each musical composition so that the playlists allow selection in a unit of a musical composition. In the example of FIG. 25, information for six musical compositions is displayed like musical compositions 511 to 516. Information of the musical compositions is configured basically similarly.

In the example of FIG. 25, for each of the musical compositions 511 to 516, an image added to a package to which the musical composition belongs, that is, a jacket image, is displayed on the left side, and a musical composition name and a player name are displayed at a central portion while the name of a device which stores musical data of the musical composition is displayed on the right side. A quadrangular shape indicated on the left side in each of the regions of the musical compositions 511 to 516 indicates the display region of the jacket image, and a character string of upper case characters such as "AIUEO" or "KAKIKUKEKO" indicated at a central portion indicates an example of the musical composition name, that is, the title of the musical composition. Meanwhile, a character string of lower case characters such as "aiueo" or "kakikukeko" below the character string of hiragana characters indicates an example of a player name, that is, an artist name. Further, an alphabetical letter such as A, B, C surrounded by a square on the right side indicates an example of the device name of a device which stores the music data. For example, it is illustrated that, for the musical composition 511, the musical composition title is "AIUEO" and the artist name is "aiueo," and the music data is stored in the portable telephone set A.

It is to be noted that all musical compositions of the playlists may be displayed in the display region 501 or some of such musical compositions may be displayed. Naturally, a page changeover button, a scroll bar or the like may be provided.

Referring back to FIG. 24, the display control section 313 controls the Bluetooth control section 331 at step S434 to issue an inquiry about a Bluetooth device which is a device having a Bluetooth communication function. The Bluetooth control section 331 outputs a detection signal for detecting a different Bluetooth device existing in the communication range through the antenna section 332. Any different Bluetooth device which receives the detection signal outputs information regarding the different Bluetooth device itself as a response to the detection signal. When the Bluetooth control section 331 receives the response, it specifies the different Bluetooth device with which it can communicate and supplies information of the different Bluetooth device as a result of the inquiry to the display control section 313.

The display control section 313 controls, at step S435, the monitor to display a display portion of that musical composition on the image of the playlist which corresponds to any device with which Bluetooth communication is impossible, for example, in gray display based on the inquiry result supplied thereto from the Bluetooth control section 331. In particular, a portion of the playlist acquired from a device which is not specified as a device with which communication is possible in the inquiry result from between the playlists displayed as the GUI image is displayed in gray. Then, the display control section 313 sets such that any musical composition displayed in gray may not be selected by the user at step S436.

When the process at step S436 comes to an end, the display control section 313 ends the playlist display control process and returns the processing to step S401 of FIG. 23 so that the processes at the steps beginning with step S402 are repeated.

In particular, the display control section 313 controls the monitor to display the playlists as a GUI image. Thereupon, the display control section 313 sets such that only a playlist acquired from any device with which Bluetooth communication is possible at present can be selected. For example, otherwise if selection of any music composition is permitted, then a musical composition whose music data is stored in a device with which Bluetooth communication is impossible may be selected. In this instance, since reproduction of the musical composition is impossible, it becomes necessary to carry out selection again for a different music composition. In other words, there is the possibility that the selection operation of a music composition may become cumbersome. The display control section 313 can suppress selection of a musical composition which may not be reproduced and facilitate selection of a musical composition by making it possible to select only a playlist acquired from a device with which Bluetooth communication is possible at present as described above.

Further, by displaying a musical composition which may not be selected in gray, the display control section 313 makes it possible for the user, who tries to select a musical composition, to readily specify any musical composition which may not be selected and hence any musical composition which can be selected thereby to further facilitate selection of a musical composition.

It is to be noted that, while, in the foregoing description, a musical composition which may not be selected is displayed in gray, musical compositions of a playlist may be displayed in any manner only if any musical composition which can be selected and any musical information which may not be selected can be identified from each other readily. For example, any musical composition which may not be selected may not be displayed or may be displayed in lower density than any musical composition which can be selected or else may be displayed in a smaller size than any musical composition which can be selected. In other words, any musical composition which may not be selected is displayed in a different displaying manner from that of any music composition which can be selected.

Further, a musical composition may be selected by an arbitrary selection method. For example, a cursor may be displayed in an overlapping relationship with a playlist such that it is operated by the user and moved to a display portion of an object musical composition so that the musical composition with which the cursor is overlapped may be selected. In this instance, for example, the cursor may be inhibited from moving to the display portion of any musical composition which may not be selected. Or a message, a picture or the like indicating that selection is impossible may be displayed when the cursor is moved to the display portion of any musical composition which may not be selected, or else, inputting of a reproduction instruction may be inhibited. In short, also the method for disabling selection may be determined arbitrarily.

Figure 26:
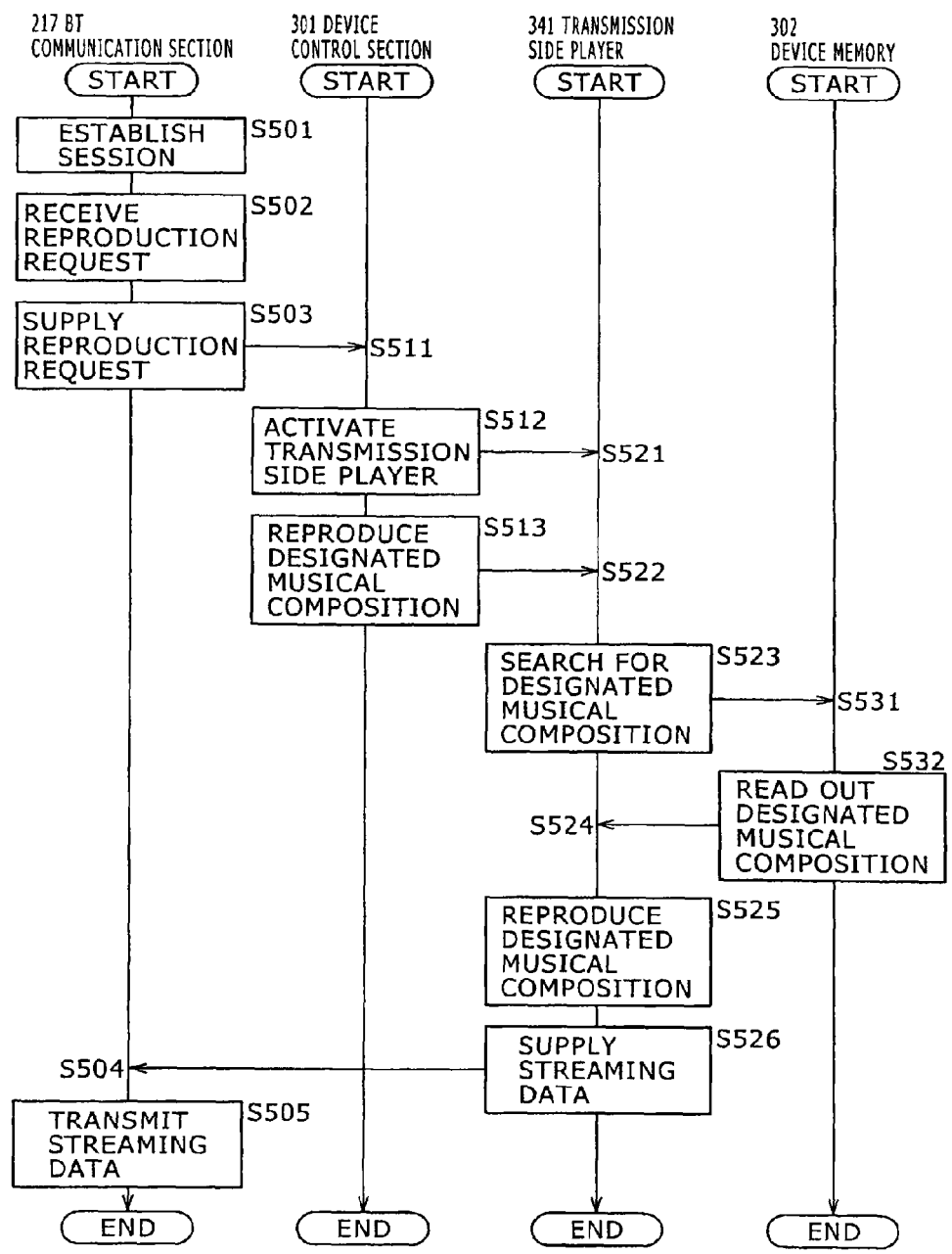
FIGS. 26 and 27 are flow charts illustrating an example of a detailed flow of a music data sharing process.

Now, details of a flow of processes for music data sharing are described. First, details of processes executed by the portable telephone set B which is a device on the side which provides music data in the example of FIG. 23 are described with reference to a flow chart of FIG. 26.

If a musical composition is selected on the portable telephone set A, then a connection request for Bluetooth communication is transmitted from the portable telephone set A to the portable telephone set B. The Bluetooth control section 331 of the Bluetooth communication section or BT communication section 217 of the portable telephone set B carries out communication with the portable telephone set A through the antenna section 332 in response to the connection request to establish a session for Bluetooth communication at step S501.

After the session is established, the Bluetooth control section 331 of the Bluetooth communication section 217 receives, at step S502, a reproduction request transmitted from the portable telephone set A. After the reproduction request is received, the Bluetooth control section 331 of the Bluetooth communication section 217 supplies the received reproduction request to the transmission side reproduction processing control section 314 at step S503.

The transmission side reproduction processing control section 314 of the device control section 301 receives the reproduction request at step S511 and activates the transmission side player 341 at step S512. The transmission side player 341 is activated based on the instruction at step S521. After the transmission side player 341 is activated, the transmission side reproduction processing control section 314 of the device control section 301 controls the transmission side player 341 at step S513 to reproduce the musical composition designated in the reproduction request.

The transmission side player 341 acquires the reproduction instruction from the transmission side reproduction processing control section 314 at step S522 and issues a request for the designated musical composition to the device memory 302 to carry out a search for the designated musical composition at step S523. The device memory 302 acquires the request at step S531 and reads out, at step S532, music data of the designated musical composition and supplies the read out music data as a search result to the transmission side player 341.

The transmission side player 341 acquires the music data supplied from the device memory 302 at step S524 and starts streaming reproduction of the music data at step S525. Then, the transmission side player 341 supplies the reproduced streaming data to the Bluetooth control section 331 at step S526. The Bluetooth control section 331 of the Bluetooth communication section 217 acquires the streaming data at step S504 and transmits the streaming data to the portable telephone set A through the antenna section 332 at step S505.

Figure 27:
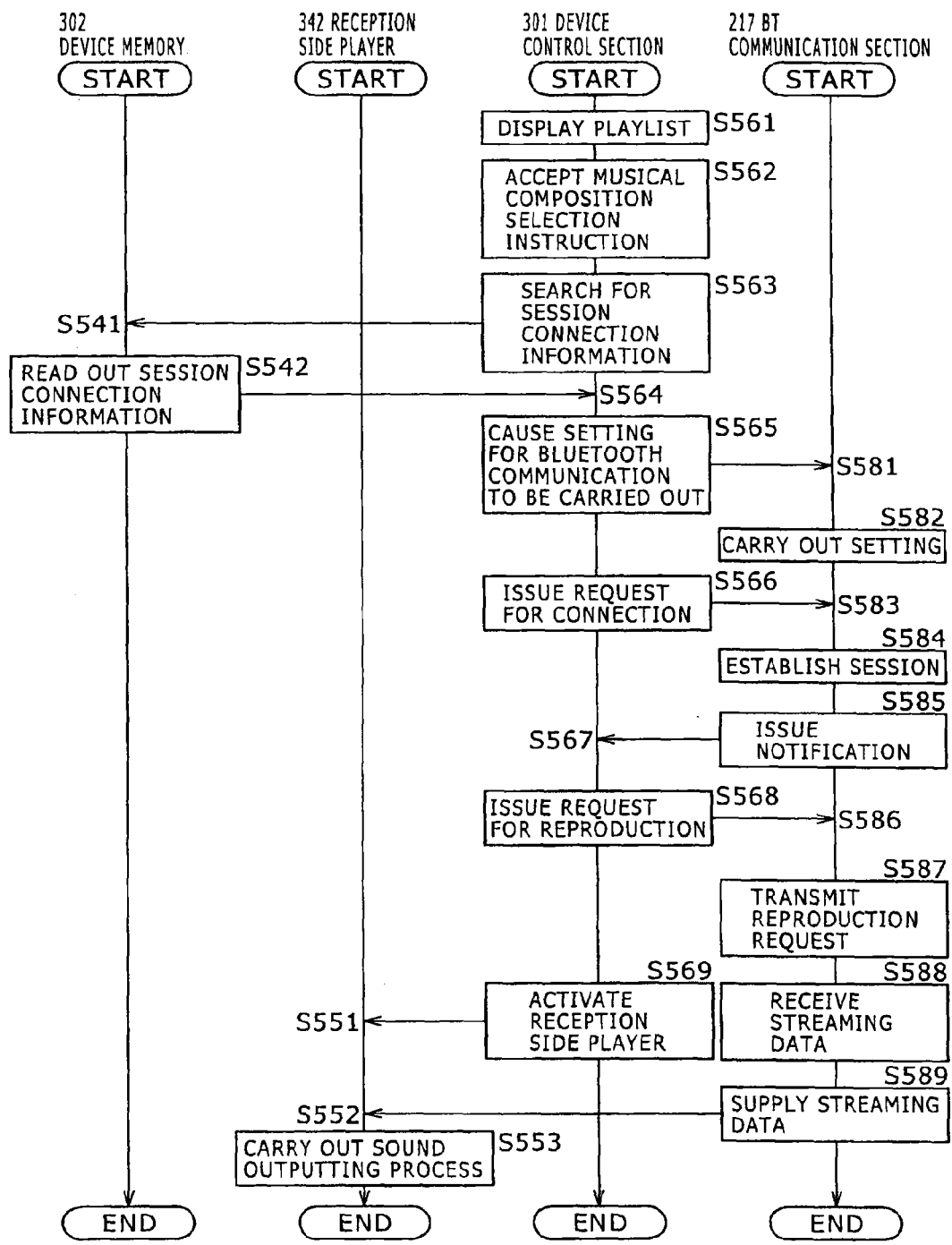

Now, details of processes executed by the portable telephone set A on the side which outputs sound of a music composition and corresponding to the processes described above with reference to FIG. 26 are described with reference to a flow chart of FIG. 27.

The reception side reproduction processing control section 315 of the device control section 301 displays playlists at step S561 and accepts a musical composition selection instruction at step S562. The processes at steps S561 and S562 correspond to the processes at steps S401 and S402 of FIG. 23, respectively.

After a musical composition is selected, the reception side reproduction processing control section 315 of the device control section 301 issues a request for session connection information necessary to establish a session with the portable telephone set B in which music data of the designated music composition are stored to the device memory 302 at step S563 to carry out a search for the session connection information. The device memory 302 acquires the request at step S541 and reads out the requested session connection information from the storage region and supplies the session connection information to the reception side reproduction processing control section 315 at step S542. The reception side reproduction processing control section 315 of the device control section 301 acquires the session connection information at step S564 and supplies the session connection information to the Bluetooth control section 331 at step S565 so that the Bluetooth control section 331 carries out setting for Bluetooth communication. The Bluetooth control section 331 of the Bluetooth communication section 217 acquires the setting request from the device control section 301 at step S581 and carries out setting for the Bluetooth communication at step S582.

The reception side reproduction processing control section 315 of the device control section 301 controls the Bluetooth control section 331 to issue a request for connection to the portable telephone set B by Bluetooth communication at step S566. The Bluetooth control section 331 of the Bluetooth communication section 217 acquires the request at step S583 and carries out communication with the portable telephone set B through the antenna section 332 to establish a session at step S584. After the session is established, the Bluetooth control section 331 of the Bluetooth communication section 217 issues a notification of the establishment of the session to the reception side reproduction processing control section 315 at step S585.

The reception side reproduction processing control section 315 of the device control section 301 acquires the notification at step S567 and controls the Bluetooth control section 331 at step S568 to issue a request for reproduction of the musical composition designated by the musical composition selection instruction accepted at step S562. The Bluetooth control section 331 of the Bluetooth communication section 217 acquires the reproduction request at step S586 and transmits the reproduction request to the portable telephone set B through the antenna section 332 at step S587.

After the reproduction request is issued, the reception side reproduction processing control section 315 of the device control section 301 activates the reception side player 342 at step S569. The reception side player 342 is activated under the control of the reception side reproduction processing control section 315 at step S551.

Further, when the portable telephone set B transmits streaming data in response to the reproduction request, the Bluetooth control section 331 of the Bluetooth communication section 217 of the portable telephone set A receives the streaming data at step S588 and supplies the received streaming data to the reception side player 342 at step S589.

The reception side player 342 acquires the streaming data at step S552 and reproduces the acquired streaming data and carries out a sound outputting process of outputting a sound signal of the streaming data at step S553.

Sharing of music data is carried out in such a manner as described above between the portable telephone set A and the portable telephone set B. Consequently, only if the users use playlists to designate a musical composition, they can share music data stored in the portable telephone sets of them. Further, since also exchange of the playlists can be carried out only by positioning the apparatus in the proximity of each other as described above, the users can share music data readily.

It is to be noted that, while the foregoing description is directed to sharing of music data between portable telephone sets, the portable telephone set 101 can share music data with an apparatus other than portable telephone sets such as the PC 103, PC 104 and audio device 105 by a similar method as described hereinabove with reference to FIG. 1. In other words, it is also possible for an apparatus other than a portable telephone set to share music data with a different apparatus.

In short, while the foregoing description is given of a portable telephone set, in place of a portable telephone set, an arbitrary information processing apparatus such as a PDA, a laptop type personal computer, an electronic dictionary or a portable music player can be used to share music data with a different apparatus. For example, also the PC 103 of FIG. 1 can share music data with a different apparatus similarly to the portable telephone set 101.

Figure 28:
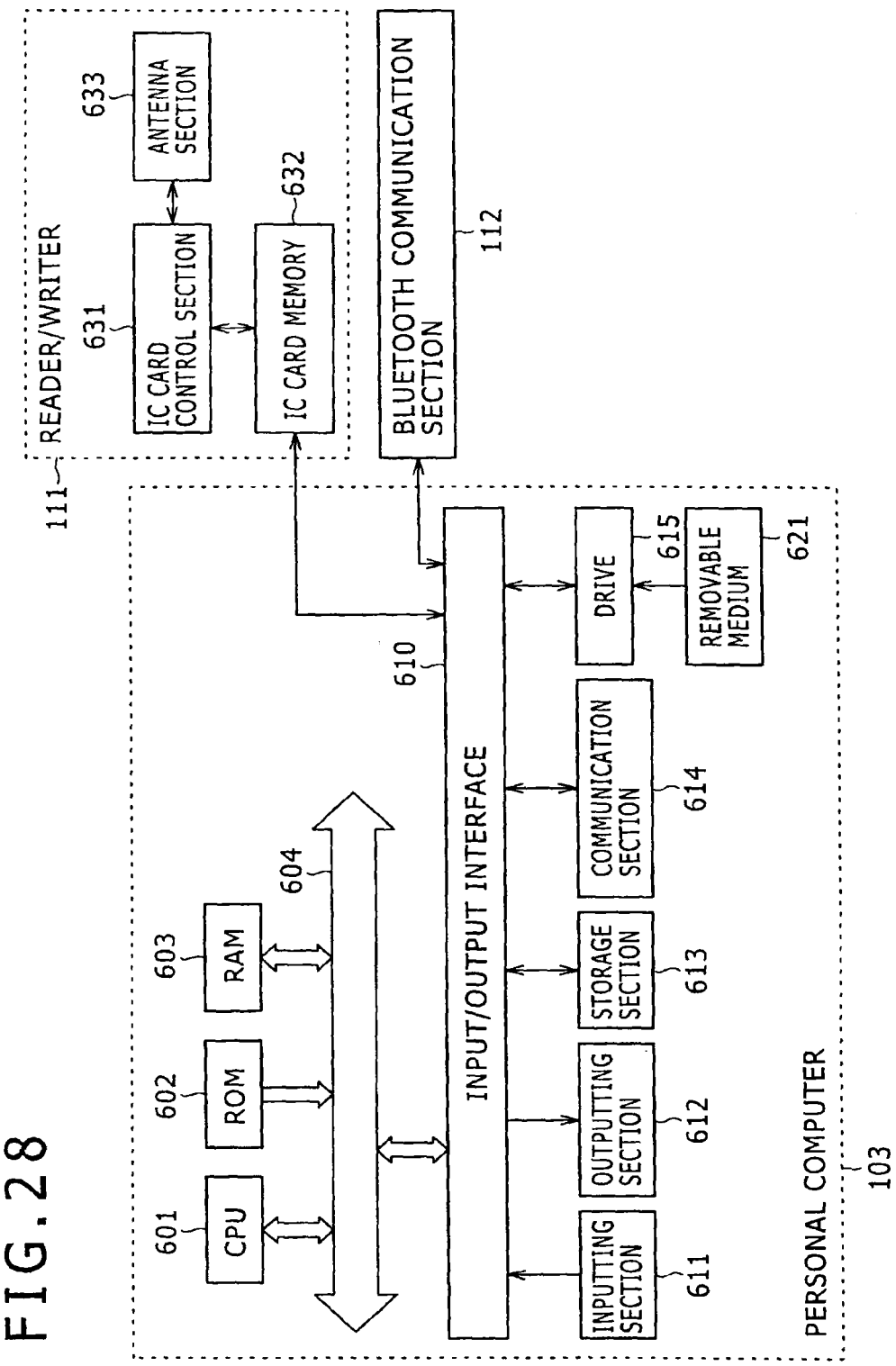
FIG. 28 is a block diagram showing an example of a configuration of a personal computer to the present invention is applied.

FIG. 28 is a block diagram showing an example of a configuration of the PC 103 and so forth.

Referring to FIG. 28, the PC 103 has a configuration basically similar to that of the portable telephone set 101 (FIG. 2) and includes a CPU 601, a ROM 602, a RAM 603 and a bus 604 corresponding to the CPU 201, ROM 202, RAM 203 and bus 204, respectively. Further, the PC 103 includes an input/output interface 610, an inputting section 611, an outputting section 612, a storage section 613, a communication section 614 and a drive 615 corresponding to the input/output interface 210, inputting section 211, outputting section 212, storage section 213, wire communication section 216 and drive 219, respectively.

The PC 103 is connected to a reader/writer 111 and a Bluetooth communication section 112 which correspond to the IC card section 218 and Bluetooth communication section 217, respectively. The reader/writer 111 has a configuration similar to that of the IC card section 218. In particular, the reader/writer 111 includes an IC card control section 631, an IC card memory 632 and an antenna section 633. The reader/writer 111 and the Bluetooth communication section 112 are connected to the input/output interface 610.

In short, the PC 103, reader/writer 111 and Bluetooth communication section 112 generally have a configuration similar to that of the portable telephone set 101 and can carry out similar processes. In this manner, some of the components may be formed as an external apparatus.

It is to be noted that, while the foregoing description is directed to sharing of music data, the content data to be shared need not be music data but may be of any type such as image data or document data. Also the playlist may be any information only if it includes information relating to data to be shared.

It is to be noted that, while the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs or into an information processing apparatus or the like of an information processing system formed from a plurality of apparatus.

The recording medium is formed as such a removable medium 221 or 621 as shown in FIG. 2 or 28 which may be a magnetic disc (including a flexible disc), an optical disc (including a CD-ROM (Compact Disc-Read Only Memory) and a DVD (Digital Versatile Disc)), or a magneto-optical disc (including an MD (MiniDisc) (Registered Trademark of Sony Corporation)), or a semiconductor memory which has the program recorded thereon or therein and is distributed to provide the program to a user separately from an apparatus body. Else, the recording medium is formed as the ROM 202 or 602, the storage section 213 or 613 or the like in which the program is recorded and which is provided to a user in a state wherein the program is incorporated in an apparatus body.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

It is to be noted that an element described as one apparatus in the foregoing description may be divided into a plurality of elements configured as different apparatus. On the contrary, a plurality of elements described as different apparatus in the foregoing description may be combined so as to be configured as a single apparatus. Furthermore, naturally it is possible to add some other element or elements than those described hereinabove to the elements of the apparatus described hereinabove. Further, if the configuration and operation of the entire system are substantially same, then some of the components of a certain apparatus may be included as a component or components of a different apparatus. In other words, the present invention is not limited to the embodiment described above, but the embodiment can be modified in various forms without departing from the spirit and scope of the present invention.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
   a proximity communication interface configured to receive management data including at least identification information of content data from a different device by proximity radio communication;
   circuitry configured to output a first display based on the management data received by the proximity communication interface, and receive a selection of the content data based on the first display; and
   a wireless communication interface configured to send a request for the content data corresponding to the selection and receive the content data corresponding to the request by wireless communication, wherein
   a communication range of the wireless communication interface is greater than that of the proximity radio communication interface.

2. The information processing apparatus according to claim 1, further comprising:
   a memory configured to store the management data received by the proximity communication interface, wherein the circuitry is configured to output the first display based on the management data stored in the memory.

3. The information processing apparatus according to claim 2, wherein the proximity communication interface is configured to further receive identification information of the different device from the different device, and the memory is configured to store the management data received by the proximity communication interface in relation to the identification information of the different device.

4. The information processing apparatus according to claim 1, wherein
   the circuitry is configured to control reproduction of the content data received by the wireless communication interface.

5. The information processing apparatus according to claim 4, wherein the circuitry is configured to control reproduction of the content data such that the content data is reproduced sequentially.

6. The information processing apparatus according to claim 1, wherein the first display includes an image relating to the content data corresponding to the identification information of content data.

7. The information processing apparatus according to claim 1, wherein the first display includes title information of the content data corresponding to the identification information of content data.

8. The information processing apparatus according to claim 1, wherein the proximity communication interface includes an integrated circuit (IC) chip.

9. The information processing apparatus according to claim 8, further comprising:
an antenna, wherein
the proximity communication interface receives the management data from the different apparatus via the antenna.

10. The information processing apparatus according to claim 1, wherein the wireless communication interface is a Bluetooth interface.

11. An information processing method comprising:
receiving management data including at least identification information of content data from a device by proximity radio communication;
outputting a first display based on the management data received;
receiving a selection of the content data based on the first display;
sending a request for the content data corresponding to the received selection; and
receiving the content data corresponding to the request by wireless communication, wherein
a communication range of the wireless communication is greater than that of the proximity radio communication.

12. The information processing method according to claim 11, further comprising:
storing, in a memory, the management data, wherein the outputting includes outputting the first display based on the management data stored in the memory.

13. The information processing method according to claim 12, further comprising:
receiving identification information of the device from the device; and
storing, in the memory, the management data in relation to the identification.

14. The information processing method according to claim 11, further comprising:
reproducing the content data received by the wireless communication.

15. The information processing method according to claim 14, wherein the reproducing includes reproducing the content data sequentially.

16. The information processing method according to claim 11, wherein the first display includes an image relating to the content data corresponding to the identification information of content data.

17. The information processing method according to claim 11, wherein the first display includes title information of the content data corresponding to the identification information of content data.

18. A non-transitory recording medium storing a computer readable program that, when executed by a processor of a computer, causes the processor to:
receive management data including at least identification information of content data from a device by proximity radio communication;
output a first display based on the management data received;
receive a selection of the content data based on the first display;
send a request for the content data corresponding to the received selection; and
receive the content data corresponding to the request by wireless communication, wherein
a communication range of the wireless communication is greater than that of the proximity radio communication.

* * * * *